(12) United States Patent
Blodt

(10) Patent No.: US 10,168,197 B2
(45) Date of Patent: Jan. 1, 2019

(54) FILL-LEVEL MEASURING DEVICE

(71) Applicant: Endress + Hauser GmbH + Co. KG,
Maulburg (DE)

(72) Inventor: Thomas Blodt, Basel (CH)

(73) Assignee: ENDRESS+HAUSER SE+CO. KG,
Maulburg (DE)

( * ) Notice: Subject to any disclaimer, the term of this patent is extended or adjusted under 35 U.S.C. 154(b) by 570 days.

(21) Appl. No.: 14/431,378

(22) PCT Filed: Aug. 28, 2013

(86) PCT No.: PCT/EP2013/067789
§ 371 (c)(1),
(2) Date: Mar. 26, 2015

(87) PCT Pub. No.: WO2014/048663
PCT Pub. Date: Apr. 3, 2014

(65) Prior Publication Data
US 2015/0253177 A1    Sep. 10, 2015

(30) Foreign Application Priority Data

Sep. 26, 2012  (DE) .................. 10 2012 109 101

(51) Int. Cl.
*G01F 23/284* (2006.01)
(52) U.S. Cl.
CPC .................. *G01F 23/284* (2013.01)
(58) Field of Classification Search
CPC ................................................. G01F 23/284
See application file for complete search history.

(56) References Cited

U.S. PATENT DOCUMENTS 4,121,220 A * 10/1978 Scillieri .................. H01Q 3/22
343/768
8,332,182 B2   12/2012 Fehrenbach
(Continued)

FOREIGN PATENT DOCUMENTS

CN     101592514 A    12/2009
CN     102264227 A    11/2011
(Continued)

OTHER PUBLICATIONS

English Translation of International Preliminary Report on Patentability, WIPO, Geneva, dated Apr. 9, 2015.
(Continued)

*Primary Examiner* — Patrick Assouad
*Assistant Examiner* — Haidong Zhang
(74) *Attorney, Agent, or Firm* — Bacon & Thomas, PLLC

(57) ABSTRACT

A fill-level measuring device working according to the pulse radar principle for measuring a fill level of a fill substance in a container, comprising: a transmission system a pulse producing system, which, comprises, in each case, at least two measurements, for each measurement, produces a transmission signal composed of at least one microwave pulse periodically following one another, of center frequency predetermined for the particular measurement. The center frequencies of the transmission signals of at least two of the measurement are different from one another. An antenna connected to the transmission system, which sends the transmission signals into the container, and receives as received signals their signal fractions reflected in the container back in the direction of the antenna, and which has for different center frequencies different spatial radiation characteristics dependent on the center frequency of the transmission signals; and connected to the transmission system and the antenna, a signal processing system, which receives (Continued)

the received signals and evaluates such based on the center frequencies of the microwave pulses of the associated transmission signals and the center frequency dependence of the spatial radiation characteristic of the antenna.

3 Claims, 10 Drawing Sheets

(56) References Cited

U.S. PATENT DOCUMENTS

| | | | |
|---|---|---|---|
| 8,700,357 B2 | 4/2014 | Fehrenbach et al. | |
| 8,868,358 B2 | 10/2014 | Mayer | |
| 8,906,938 B2 | 12/2014 | Fan et al. | |
| 2004/0056667 A1 | 3/2004 | Lutke et al. | |
| 2004/0090290 A1* | 5/2004 | Teshirogi | H01Q 13/22 333/237 |
| 2004/0108951 A1* | 6/2004 | Edvardsson | G01F 23/284 342/124 |
| 2005/0140556 A1* | 6/2005 | Ohno | H01Q 13/20 343/770 |
| 2009/0256737 A1 | 10/2009 | Ohlsson | |
| 2010/0031753 A1 | 2/2010 | Mayer et al. | |
| 2011/0166805 A1* | 7/2011 | Hammer | G01F 23/284 702/55 |
| 2011/0193567 A1* | 8/2011 | Klofer | G01F 23/284 324/642 |
| 2012/0056776 A1* | 3/2012 | Shijo | G01S 7/03 342/146 |
| 2012/0169528 A1* | 7/2012 | Edvardsson | G01F 23/284 342/124 |

FOREIGN PATENT DOCUMENTS

| | | |
|---|---|---|
| DE | 10051025 A1 | 4/2002 |
| DE | 10051297 A1 | 4/2002 |
| DE | 10393855 T5 | 2/2006 |
| DE | 102008048582 A1 | 3/2010 |
| DE | 102010014457 A1 | 10/2011 |
| EP | 2128576 A1 | 12/2009 |
| WO | 0233439 A1 | 4/2002 |
| WO | 2004051198 A1 | 6/2004 |
| WO | 2004057366 A1 | 7/2004 |

OTHER PUBLICATIONS

International Search Report EPO, The Netherlands, dated Nov. 28, 2013.

German Search Report, German PTO, Munich, dated Jul. 2, 2013.

* cited by examiner

FILL-LEVEL MEASURING DEVICE

TECHNICAL FIELD

The invention relates to a fill-level measuring device working according to the pulse radar principle for measuring a fill level of a fill substance in a container and includes: a transmission system having a pulse producing system connected to a control unit, which is embodied in such a manner that it produces for each measurement a transmission signal composed of microwave pulses of a predetermined center frequency; an antenna connected to the transmission system, which sends the transmission signals into the container, and receives as received signals their signal fractions reflected in the container back in the direction of the antenna after a travel time dependent on the distance from the associated reflector of the fill-level measuring device; and a process system connected to the transmission system and the antenna signal, which evaluates the received signals.

BACKGROUND DISCUSSION

Such contactless fill level measuring devices working according to the pulse radar principle are applied in a large number of branches of industry, especially in the processing industry, in chemistry and in the foods industry.

Conventional pulse radar-fill level measuring devices have regularly a transmission system having a pulse producing system connected to a control unit, which is embodied in such a manner that it produces for each measurement a transmission signal composed of microwave pulses produced with a predetermined pulse repetition rate and having a fixedly predetermined center frequency, which is the same for all measurements. The microwave pulses have, for example, fixedly predetermined center frequencies of 26 GHz or 78 GHz. The antenna is mounted on the container above the highest fill level to be measured, oriented toward the fill substance, and sends the transmission signals into the container. Subsequently, it receives as received signals their signal fractions reflected on reflectors located in the container back toward the fill-level measuring device after a travel time dependent on distance from the respective reflectors. The received signals are fed to a signal processing system connected to the transmission system and the antenna. The signal processing system then determines the fill level based on the received signals.

In such case, measurement curves are regularly derived, which provide the amplitudes of the received signals as a function of their travel time required for the path to the respective reflectors and back. From the travel times of the maxima of these measurement curves, then, based on the propagation velocity of the microwave pulses, the distance from the respective reflectors can be determined by the fill-level measuring device.

For fill level measurement, currently a large number of different evaluation methods are applied. These methods are frequently referred to as echo recognition methods. They are used to ascertain which of the maxima contained in a measurement curve can be attributed to the reflection on the surface of the fill substance. In such case, for example, the first occurring maximum or the maximum having the greatest amplitude is determined to be the maximum of the respective measurement curve attributable to the reflection on the surface of the fill substance. From the travel time of this maximum, based on the propagation velocity of the microwave pulses, the distance of the surface of the fill substance from the fill-level measuring device is derived, which then based on the installed height of the antenna is convertible into the fill level—thus the fill level of the fill substance in the container.

These fill level measuring devices deliver reliable measurement results in a large number of different applications.

For fill level measurement of bulk goods, they are, however, as a rule, not optimally suitable, since bulk goods regularly form hill or valley shaped, bulk goods cones, whose surface profiles cannot be registered with these fill-level measuring devices and, thus, cannot be taken into consideration for fill level determination.

In these applications, consequently, currently clearly more complex, mapping radar measuring systems are applied, with which a surface profile of the surface of the fill substance can be plotted. Mapping radar systems require, however, an antenna system composed of a number of spatially neighbored antennas, which are connected with one another via an electrical control unit, and, depending on the embodiment, serve based on a time schedule as a transmitting antenna, as a receiving antenna or as a transmitting and receiving antenna. In such case, the beam paths of the transmitted and received signals R varied by the electronically controlled activating of different antennas as transmitting, respectively receiving, antennas in such a manner that, based on the signal travel times measured on different beam paths for maxima of the received signals attributable to reflections on the surface of the fill substance in conjunction with the positions of the respectively used transmitting and receiving antennas, a profile of the surface of the fill substance can be calculated.

Alternatively, spatial profiles of fill level upper surfaces can be plotted with fill-level measuring devices, which have a single antenna, which is arranged mechanically swingably over the fill substance. Also in this way, by successively executed measurements with progressively changed antenna orientations, a surface profile of the fill substance upper surface can be ascertained. Mechanically swingable antennas are, however, clearly complex to manufacture, mechanically delicate and maintenance intensive. Another alternative is to use a number of mutually independent, neighboring, fill level measuring devices operated next to one another, whose measurement results are taken into consideration together with their respective positions for determining a surface profile.

Likewise, in given cases, problematic is the use of conventional fill level measuring devices with a single, rigidly mounted antenna in applications, in which installed objects (referred to herein as disturbances), such as e.g. other measuring devices or filling nozzles, are present protruding laterally into the container into the beam path of the transmission signals.

A reliable measurement is then only possible, when the maxima of the measurement curves attributable to the surface of the fill substance can be identified. For this, it is necessary to be able reliably to distinguish the maxima produced by the surface of the fill substance from the maxima of the measurement curves produced by disturbances.

If the position of a disturbance is known beforehand, then the associated travel time range in the measurement curves can, for example, be masked out. Alternatively, measurement curve amplitudes occurring in this region are only taken into consideration, when they exceed a predetermined threshold value. These methods referenced herein as disturbance echo masking methods assume, however, that the position of the disturbance is known beforehand or can be reliably ascertained in some other manner.

Alternatively or supplementally for this, currently so-called-echo tracking methods are applied, in the case of which, in sequential measurements, measurement curves are plotted, and, based on these measurement curves, the time development of maxima of the measurement curves associated with the travel times of certain reflectors, especially the surface of the fill substance, the container floor or the disturbance, is ascertained. Based on this echo tracking, then prognoses for the expected travel times of the maxima of the measurement curves attributable to a certain reflector can be created, which subsequently are applied for improving reliability or for reviewing the associating of the maxima then actually established in the next measurement curve to the respective reflectors. In such case, however, also here, it is necessary that, at the start, at least once, a reliable associating of the maxima to the associated reflectors be predetermined or otherwise ascertained, before their time development can be tracked, respectively their future development predicted.

SUMMARY OF THE INVENTION

It is an object of the invention to provide a mechanically simple and robustly constructed fill-level measuring device working according to the pulse radar principle, which fill-level measuring device is reliably applicable in a large number of different applications, especially also in applications with bulk good shaped fill substances and/or disturbances protruding laterally into the container.

For achieving this object, the invention resides in a fill-level measuring device working according to the pulse radar principle for measuring a fill level of a fill substance in a container, comprising:

a transmission system having, connected to a control unit,
 a pulse producing system,
  which is embodied in such a manner that, in predetermined measuring cycles comprising, in each case, at least two measurings, for each measuring, it produces a transmission signal composed of microwave pulses of a center frequency predetermined for the particular measuring, wherein the center frequencies of the transmission signals of at least two of the measurings are different from one another;
connected to the transmission system, an antenna,
 sends the transmission signals into the container, and receives as received signals their signal fractions reflected in the container back in the direction of the antenna after a travel time dependent on the distance from the associated reflector of the fill-level measuring device, and
 which has for different center frequencies different spatial radiation characteristics dependent on the center frequency of the transmission signals; and
connected to the transmission system and the antenna, a signal processing system,
 which receives the received signals and evaluates such based on the center frequencies of the microwave pulses of the associated transmission signals and the center frequency dependence of the spatial radiation characteristic of the antenna.

In a first variant of the invention, the antenna is an antenna, especially a horn-, rod- or reflector antenna, which has a radiation characteristic, which includes a main lobe pointing in a main transmission direction and having an aperture angle rising with decreasing center frequency of the transmission signals.

In a second variant of the invention, the antenna is a hollow conductor, slot antenna, especially a hollow conductor, slot antenna having a rod-shaped, rectangular, hollow conductor,
 which has an input fed by the transmission system,
 whose end lying opposite the input is terminally short circuited, terminated with a reflection free termination, or open, and
 which has a hollow conductor wall, which is provided with cutouts, especially with slot shaped, slot like or fractal shaped cutouts, via which the antenna sends the transmission signals with a spatial radiation characteristic different for different center frequencies dependent on the positioning and dimensioning of the cutouts and the center frequencies of the supplied transmission signals.

In an embodiment of the second variant, the antenna includes a focusing apparatus for focusing the transmission signals emerging from the antenna, especially
 a funnel-shaped or rectangular, hollow conductor segment arranged outwardly on the hollow conductor wall and enclosing all cutouts,
 a lens arranged outwardly on the hollow conductor wall, especially a dielectric lens or a magnetic lens,
 plates of one or more planar plies of a dielectric material applied outwardly on the cutouts, or
 other rectangular, hollow conductors embodied identically to the rectangular, hollow conductor and connected with the rectangular, hollow conductor to form a group of parallelly amplitude- and phase equally fed, rectangular hollow conductors arranged together, parallel to one another, directly next to one another and perpendicular to the longitudinal axis of the rectangular, hollow conductor.

In an additional embodiment of the second variant
 the cutouts are positioned and dimensioned in such a manner that the radiation characteristic of the antenna in the case of end closed with a reflection free termination has a main transmission lobe and, in the case of short-circuited or open end, two main transmission lobes extending symmetrically to the surface normal to the hollow conductor wall, and
 an angle at which the main transmission lobes extend relative to the surface normal to the hollow conductor wall changes with the center frequency of the transmission signals.

Additionally, the invention resides in a first method for measuring a fill level of a fill substance having a planar surface in a container by means of a fill-level measuring device working according to the pulse radar principle according to the first variant, comprising steps as follows:
 in a measuring cycle measurings with transmission signals of different center frequencies are executed, wherein, in each case,
 a transmission signal having microwave pulses of a center frequency predetermined for the particular measuring is sent,
 its associated received signal is received, and
 based on the received signal, in each case, a measurement curve is derived, which shows the amplitude of the respective received signal as a function of associated signal travel time,
 for each measurement curve, travel time and maximum amplitude of maxima of the measurement curve are determined, which are, in each case, attributable to a reflection on a reflector located in the container, especially on the fill substance, on the container floor or on a disturbance protruding laterally into the beam path of the transmission signals, based on the travel times of the maxima of the registered measurement curves, those maxima contained in the different measurement curves are determined, which are attributed to the same reflector, based on the maximum amplitudes of the maxima of the measurement curves attributable to the same reflector and the associated radiating characteristics, information concerning a separation is derived, with which the particular reflector is located in a plane extending perpendicular to the main transmission direction of the antenna from the axis of the main transmission direction, wherein the maxima attributable to the same reflector have at greater separation of this reflector at higher center frequencies a lower maximum amplitude than at lower center frequencies and at less separation at higher center frequencies a greater maximum amplitude than at lower center frequencies.

In a further development of the first method, maxima attributable to reflections on a disturbance protruding laterally into the container and maxima of the measurement curves attributable to reflections on the surface of the fill substance or on the container floor are distinguished based on the information concerning the separations of the reflectors.

In a further development of the latter further development, the differences found in the measuring cycles between maxima attributable to reflections on a disturbance protruding laterally into the container and maxima of the measurement curves attributable to reflections on the surface of the fill substance or on the container floor are applied in a subsequent determining of fill level, especially in a method for masking amplitude portions of the respective measurement curves attributable to reflections on the disturbance or in the performance or review of a method, in which for at least one reflector a time development of the maxima attributable to reflections on the respective reflector is determined based on measurement curves derived from sequentially executed measuring cycles.

Additionally, the invention resides in a second method for measuring a fill level of a fill substance in a container by means of a fill-level measuring device working according to the pulse radar principle according to the first variant in applications in which the fill substance forms a surface extending essentially rotationally symmetrically to the axis of the main transmission direction, comprising steps as follows:

in a measuring cycle measurings with transmission signals of different center frequencies are executed, wherein, in each case, a transmission signal having microwave pulses of a center frequency predetermined for the particular measuring is sent, its associated received signal is received, and based on the received signal, in each case, a measurement curve is derived, which shows the amplitude of the respective received signal as a function of associated signal travel time, the transmission signals, as a result of different aperture angles of the main lobes at the different center frequencies, in the individual measurings illuminate differently large concentric breadths in the container, and based on the concentric breadths and the amplitude behaviors of the measurement curves in a travel time range, in which maxima attributed to reflections on the fill substance occur in the measurement curves, a profile of the surface of the fill substance in the container is derived.

A further development of the second method includes a method, wherein the fill substance in the container forms a bulk goods cone, whose cone longitudinal axis coincides with the axis of the main transmission direction of the antenna, based on the travel time, at which the maximum attributed to the reflection on the fill substance occurs for the measurement curve derived with the highest center frequency, a fill level of the fill substance in the region of the cone tip is determined, differences between the individual measurement curves derived with transmission signals of adjoining center frequency are formed, for each difference a travel time of the maximum of the respective difference is determined, associated with the differences is, in each case, an average transmission angle formed with the axis of the main transmission direction, at which angle the transmission signal having the, in each case, lower center frequency is sent onto an annular region, which lies outside of the breadths illuminated with the transmission signal with the respectively higher center frequency and within the breadths illuminated with the transmission signal with the respectively lower center frequency, and based on the travel times of the maxima of the differences and the associated transmission angles, fill levels of the fill substance in the container are determined at distances from the cone axis perpendicular to the cone axis determined via the respective associated travel times and the associated transmission angles.

Additionally, the invention resides in a third method for measuring a fill level of a fill substance in a container by means of a fill-level measuring device working according to the pulse radar principle according to the additional embodiment of the second variant with an antenna having a terminally reflection free, closed, rectangular, hollow conductor, comprising steps as follows:

in a measuring cycle measurings with transmission signals of different center frequencies are executed, wherein, in each case, a transmission signal having microwave pulses of a center frequency predetermined for the particular measuring is sent, its associated received signal is received, and based on the received signal, in each case, a measurement curve is derived, which shows the amplitude of the respective received signal as a function of associated signal travel time, for each measurement curve, the travel time of the therein contained maximum attributable to a reflection on the surface of the fill substance is determined, and based on these travel times, the center frequencies of the associated transmission signals and the angles, which the main transmission lobe forming at the respective center frequencies form with the surface normal, fill levels of the fill substance in the container are determined at separations from the surface normal perpendicular to the surface normal determined via the travel times and the respectively associated angles.

Additionally, the invention resides in a fourth method for measuring a fill level of a fill substance in a container by means of a fill-level measuring device working according to the pulse radar principle according to the additional embodiment of the second variant with an antenna having a terminally open or short-circuited rectangular, hollow conductor in applications in which the fill substance forms a surface extending in a transmission plane of the antenna essentially symmetrically to the surface normal to the rectangular, hollow conductor, comprising steps as follows:

in a measuring cycle measurings with transmission signals of different center frequencies are executed, wherein, in each case, a transmission signal having microwave pulses of a center frequency predetermined for the particular measuring is sent, its associated received signal is received, and based on the received signal, in each case, a measurement curve is derived, which shows the amplitude of the respective received signal as a function of associated signal travel time, for each measurement curve, the travel time of the therein contained maximum attributable to a reflection on the surface of the fill substance is determined, and based on these travel times, the center frequencies of the associated transmission signals and the angles, which the main transmission lobes forming at the respective center frequencies form with the surface normal, fill levels of the fill substance in the container are determined at separations from the surface normal perpendicular to the surface normal determined via the travel times and the respectively associated angles.

Additionally, the invention includes a method according to a further development of the second, third or fourth method, in the case of which, based on the measurement points given by the fill levels and the respectively associated separations, at which they occur, especially through interpolation, filtering, or smoothing, a profile is derived that shows the fill level as a function of separation.

In a further development of the latter method, the profile is examined for sharp bends or jumps of fill level as a function of separation.

In a preferred form of embodiment of the aforementioned method, the amplitudes of the measurement curves are subjected to a normalization, which takes into consideration the directional dependence of the radiation characteristic of the antenna dependent on the center frequency of the microwave pulses of the respective transmission signal.

Additionally, the invention resides in a hollow conductor, slot antenna for sending or for sending and receiving of signals of different center frequencies lying within a spectrum bounded by a lower limit frequency and an upper limit frequency and having a spatial radiation characteristic different for different center frequencies dependent on the center frequency of the respective signal, comprising:

a rectangular, hollow conductor, which has an input, via which the rectangular, hollow conductor is fed with the signals to be sent, whose end lying opposite the input is terminally short circuited, terminated with a reflection free termination, or open, and which has a hollow conductor wall, which is equipped with slot shaped cutouts, which are arranged one after the other in two rows extending, in each case, parallel to the longitudinal axis of the rectangular, hollow conductor at the same separation from the center of the hollow conductor wall, wherein the two rows are identical relative to the shape and the separations of the cutouts following one after the other therein, the two rows are arranged offset relative to one another in the longitudinal direction of the rectangular, hollow conductor by an offset, which lies in the order of magnitude of half of the wavelength forming in the rectangular, hollow conductor at the upper limit frequency, the cutouts in each row follow one another periodically in a period distance, which lies in the order of magnitude of the wavelength forming in the rectangular, hollow conductor at the lower limit frequency, and the cutouts have a length, which lies in the order of magnitude of half of the wavelength forming in the rectangular, hollow conductor at the upper limit frequency, and is significantly smaller than the offset.

The fill level measuring devices of the invention offer the advantage that they are reliably applicable in a comparatively broad spectrum of different applications, especially in applications with disturbances protruding laterally into the container and in applications with fill substances forming bulk good cones. Since only a single mechanically rigid antenna is required, they are, in comparison with fill-level measuring devices with swingable antennas mechanically robust and less susceptible to fouling. Moreover, they require, in comparison to measuring devices with a number of transmitting- and/or receiving antennas, little space at the location of installation. Especially, they require for mounting the antenna only a single container opening, which, moreover, can be clearly smaller than container openings for mechanically swingable antennas and clearly more complex, mapping radar systems.

BRIEF DESCRIPTION OF THE DRAWINGS

The invention and its advantages will now be explained in greater detail based on the figures of the drawing, in which two examples of embodiments are shown. Equal parts are provided in the figures with equal reference characters. The figures of the drawing show as follows.

DETAILED DISCUSSION IN CONJUNCTION WITH THE DRAWINGS

Figure 1:
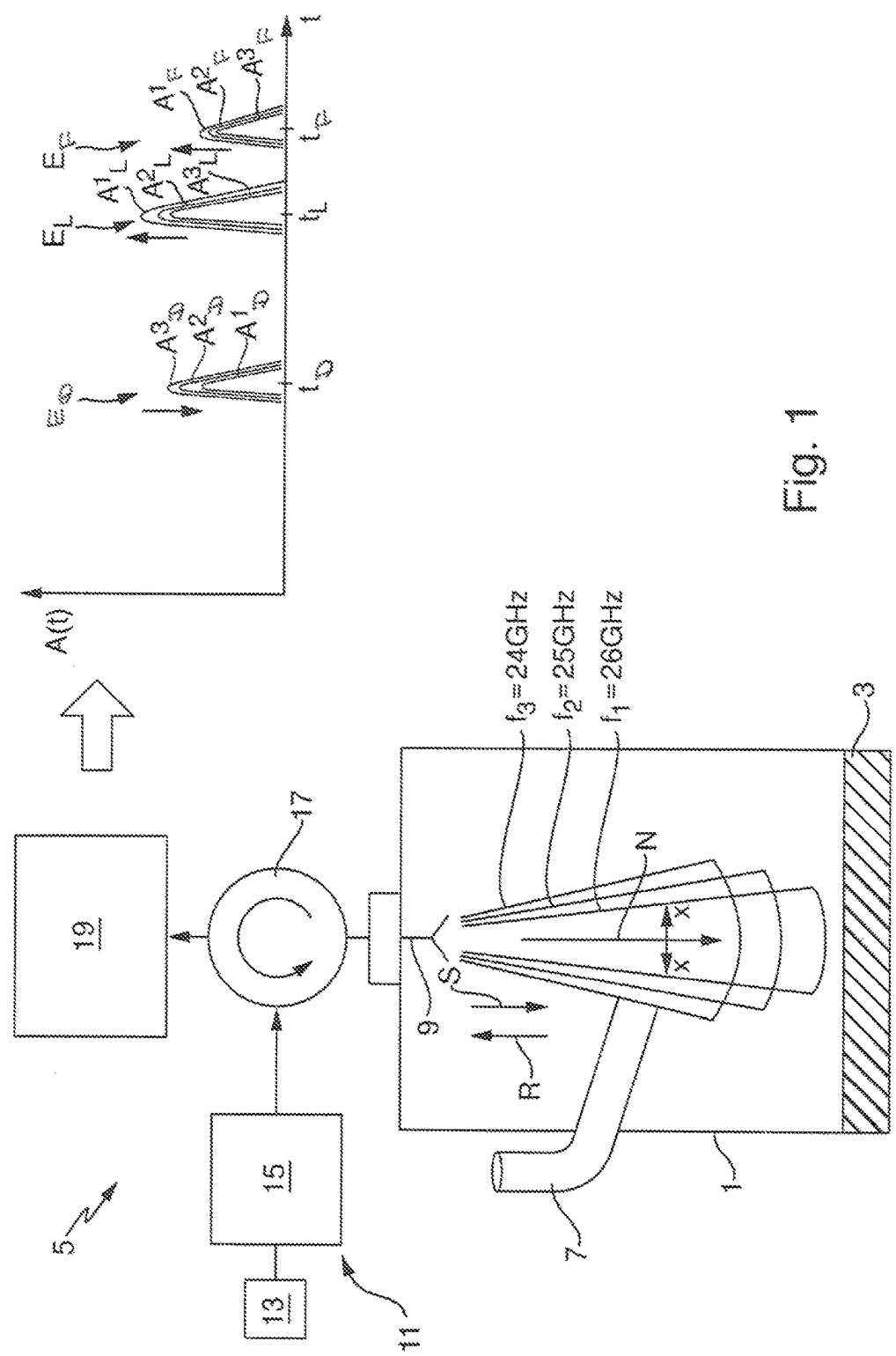
FIG. 1 is a fill level measuring arrangement with a fill-level measuring device equipped with a horn antenna, wherein a disturbance protrudes laterally into the container.

FIG. 1 shows a schematic representation of a fill level measuring arrangement. Measured there in a container 1 with a fill-level measuring device 5 working according to the pulse radar principle is the fill level L of a fill substance 3 forming a planar surface. In the illustrated example of application, by way of example, a disturbance 7, e.g. a container-internal object, protruding laterally into the container 1 is shown.

The fill-level measuring device 5 includes, mounted above the highest fill level L to be measured in the container 1 and pointing toward the fill substance 3, a single antenna 9, via which, in measurement operation, transmission signals S are sent toward the fill substance 3 and their signal fractions reflected back in the container 1 in the direction of the antenna 9 as received signals R received.

According to the invention, the fill-level measuring device 5 includes a transmission system 11, which has connected to a control unit 13 a pulse producing system 15, which is embodied in such a manner that it produces in measurement operation transmission signals $S_n$ in predetermined measuring cycles comprising, in each case, at least two measurings. Each transmission signal $S_n$ is composed of microwave pulses of a center frequency $f_n$ predetermined for the particular measuring and produced by means of the pulse producing system 15 with a predetermined repetition rate. In such case, the center frequency $f_n$ for the particular measuring with the microwave pulses of the transmission signal $S_n$ used in the measuring is predetermined by the control unit 13. Fundamentally, when required, also very short transmission signals $S_n$, especially transmission signals $S_n$ of just a few, e.g. 3-8, microwave pulses following one after the other, can be applied. Preferably, however, to adapt to the metrologically to be registered, maximum distance between fill substance 3 and fill-level measuring device 5, transmission signals $S_n$ with a clearly greater number of sequentially following microwave pulses are applied.

According to the invention, in each measuring cycle at least two measurings are performed, which differ in the center frequency $f_n$ of the microwave pulses of the transmission signals $S_n$ sent in the respective measuring. Preferably, a clearly greater number, e.g. from 30-50, of different center frequencies $f_n$ are used in a correspondingly large number of measurings.

The transmission signals $S_n$ are transmitted to the antenna 9 via a transmission system 11 connected, transmitting/receiving separator 17, e.g. a circulator or a directional coupler in conjunction with a matched termination. The antenna 9 sends the transmission signals $S_n$ toward the fill substance 3 in the container 1, and receives their signal fractions reflected on a reflector located in the container 1, especially on the surface of the fill substance, on the container floor or on the disturbance 7, back in the direction of the antenna 9 after a travel time t dependent on the distance of the respective reflector from the fill-level measuring device 5 and the propagation velocity of the microwave pulses. The sum of the received reflected signal fractions forms, in each case, a received signal $R_n$, which is fed via the transmitting/receiving separator, or directional coupler, 17 to a signal processing system 19, which evaluates the received signals $R_n$ taking into consideration the radiation characteristic of the antenna 9 dependent on the center frequency $f_n$ of the microwave pulses of the associated transmission signals $S_n$.

According to the invention, the antenna 9 has a spatial radiation characteristic dependent on the frequency f of the transmitted signals. The radiation characteristic represents the directional dependence of the antenna gain. Thus, the radiation density transmitted at the sending of a transmission signal $S_n$ in the various spatial directions in the case of equal total transmission power is dependent on the center frequency $f_n$ of the microwave pulses of the respective transmission signal $S_n$ and different for transmission signals $S_n$ of different center frequency $f_n$.

In a first variant of the invention illustrated in FIG. 1, for this, an antenna 9 can be applied, whose radiation characteristic has a single dominant main lobe radiated in a main transmission direction N for all center frequencies $f_n$ and having an aperture angle $\alpha_n$ rising with decreasing center frequency $f_n$ of the transmission signals $S_n$.

For this, for example, horn antennas can be applied, such as those already currently applied in conventional fill-level measuring devices. Conventional horn antennas are presently operated with a fixed center frequency and a bandwidth essentially predetermined by the reciprocal of the pulse length. They are, however, regularly sufficiently broadband that they can be operated with center frequencies differing from this center frequency. Preferably, they are operated in the fill-level measuring device 5 of the invention with different center frequencies $f_n$, all of which lie within a predetermined ISM-band. Preferred frequency ranges for the center frequencies $f_n$ are especially center frequencies in the range from 4 GHz-8 GHz in the C-band, in the order of magnitude from 10 GHz in the X band, in the order of magnitude from 77 GHz in the E-band, or in the order of magnitude of 123 GHz in the F-band. Other preferred frequency ranges lie at 2.4 GHz-2.5 GHz, at 5.7 GHz-5.8 GHz, at 24 GHz-26 GHz, as well as in the order of magnitude of 61 GHz, 110 GHz or 245 GHz.

Alternatively, also reflector antennas, especially parabolic antennas, can be applied. Fundamentally, also use of dielectric rod antennas is possible. The latter have, however, also at higher center frequencies $f_n$ already main lobes with comparatively large aperture angles, so that the aperture angle changes achievable by small variations the center frequencies here turn out to be less than in the case of the other mentioned antenna types.

Same as in the case of conventional pulse radar fill level measuring devices, also the fill-level measuring device 5 of the invention derives based on the received signals $R_n$, in each case, a measurement curve $A_n(t)$, which shows the amplitude A of the respective received signal $R_n$ as a function of associated signal travel time t.

For this, the received signals $R_n$ are preferably superimposed on a reference signal, which is composed of microwave pulses, which have the same pulse length and the same center frequency $f_n$ as the microwave pulses of the transmission signal $S_n$, but which, however, are generated periodically with a repetition rate, which differs from the repetition rate, with which the microwave pulses of the transmission signal $S_n$ are generated, by a small frequency difference. This superimposing effects a stroboscopic sampling of the sequentially entering, essentially identical, reflection pulses, the end result being a time-expanded mapping of the amplitude curve of a reflection pulse as a function of travel time. Corresponding signal conditioning-, processing- and evaluating methods are sufficiently known from the state of the art and, consequently, not described here in detail.

In order to achieve a comparability of the amplitude values of the individual measurement curves $A_n(t)$, the amplitudes A of the measurement curves $A_n(t)$ are subjected to a normalization, which takes into consideration the directional dependence of the radiation characteristic of the antenna 7 as a function of the center frequency $f_n$ of the microwave pulses of the respective transmission signals $S_n$. In this way, in the case of the individual measurings at equal transmission power of the antenna 7, the different radiation density sent per solid angle is taken into consideration. If, in the case of the individual measurings, different transmission powers are applied, then this is likewise to be taken into consideration by corresponding normalization of the measurement curves $A_n(t)$.

To the extent that in the individual measurings at different center frequencies $f_n$, because of signal conditioning and processing, different time expansion factors result in the time expanded amplitude curves, these are subsequently naturally likewise to be taken into consideration. This happens preferably by the individual derivatives of subsequent scalings, by which the measurement curves $A_n(t)$ of the individual measurings are referenced to the same time scale.

In contrast to conventional pulse radar, fill-level measuring devices, in the case of which all measurings are executed with identical transmission signals S, with the fill-level measuring device of the invention measuring cycles are executed, which comprise at least two measurings, which differ by the center frequency $f_n$ of the microwave pulses of the transmission signals $S_n$ used therefor.

The measuring principle underpinning the invention will be described below using the example of a measuring cycle comprising three measurings. Preferably, however, measurings are performed using a very much greater number of different center frequencies $f_n$, for example, 30-50 different center frequencies $f_n$.

In the first measuring, a first transmission signal $S_1$ is transmitted, whose microwave pulses have a center frequency $f_1$, for example, a center frequency of 26 GHz. In the second measuring, a second transmission signal $S_2$ is transmitted, whose microwave pulses have a lower center frequency $f_2$, for example, a center frequency of 25 GHz. In the third measuring, a third transmission signal $S_3$ is transmitted, whose microwave pulses have a yet lower center frequency $f_3$, here a center frequency of 24 GHz.

For purposes of illustration, FIG. 1 shows the spatial radiating characteristics of the antenna 9 for the individual measurings alongside one another. The radiating characteristics comprise, in each case, a main lobe pointing in the main transmission direction N and having an aperture angle $\alpha_n$ which increases with decreasing center frequency $f_n$.

For each of the three measurings, based on the respectively obtained, received signal $R_1$, $R_2$, $R_3$, a measurement curve $A^1(t)$, $A^2(t)$, $A^3(t)$ normalized and scaled in the above described manner is derived, which shows the amplitude A of the respective received signal $R_1$, $R_2$, $R_3$ as a function of associated signal travel time t.

The three measurement curves $A^1(t)$, $A^2(t)$, $A^3(t)$ derived by means of the signal processing system 19 are shown in comparison with one another in the figure portion in FIG. 1 to the right of the signal processing system 19. For each measurement curve $A^n(t)$ with n=1, 2, 3, travel time $t''_D$, $t''_L$, $t''_B$ and maximum amplitude $A''_D$, $A''_L$, $A''_F$ of the therein contained maxima $E_D$, $E_L$, $E_F$ are determined. Each of these maxima $E_D$, $E_L$, $E_F$ is attributable to a reflection on a reflector located in the container 1. In the present example, all three measurement curves $A^1(t)$, $A^2(t)$, $A^3(t)$ contain, in each case, a maximum $E_D$ attributable to a reflection on the disturbance 7 protruding laterally into the beam path, a maximum $E_L$ attributable to a reflection on the surface of the fill substance, and a maximum $E_F$ attributable to a reflection on the container floor.

Maxima $E_D$, $E_L$, $E_F$ attributed to the given reflectors occur in the different measurement curves $A^1(t)$, $A^2(t)$, $A^3(t)$ about at the same travel times $t_D \approx t^1_D \approx t^2_D \approx t^3_D$, $t_L \approx t^1_L \approx t^2_L \approx t^3_L$, $t_F \approx t^1_F \approx t^2_F \approx t^3_F$. Accordingly, based on the travel times $t''_D$, $t''_L$, $t''_F$ ascertained for the individual measurement curves $A^n(t)$, the maxima $E_D$, $E_L$, $E_F$ contained in the different measurement curves $A^1(t)$, $A^2(t)$, $A^3(t)$ are determined, which are attributable to the same respective reflectors.

Based on the individual measurement curves $A^1(t)$, $A^2(t)$, $A^3(t)$ registered with different center frequencies $f_1$, $f_2$, $f_3$, then based on the different maximum amplitudes $A^1_D$, $A^2_D$, $A^3_D$; $A^1_L$, $A^2_L$, $A^3_L$; $A^1_F$, $A^2_F$, $A^3_F$ of the maxima $E_D$, $E_L$, $E_F$ of the measurement curves $A^1(t)$, $A^2(t)$, $A^3(t)$ attributable to the same reflector, information concerning a separation x can be derived for how far from the axis of the main transmission direction N the particular reflector is located in a plane extending perpendicular to the main transmission direction N of the antenna 9.

This derivation rests on the fact that maxima $E_D$, $E_L$, $E_F$ of different measurement curves $A^n(t)$ attributable to the same reflector have at greater separation x of this reflector from the axis of the main transmission direction N at higher center frequencies $f_n$ a lower maximum amplitude than at lower center frequencies $f_n$, while they have at small separation x at higher center frequencies $f_n$ a greater maximum amplitude A than at low.

In the present example, the maximum $E_D$ attributed to the disturbance 7, due to the comparatively large distance x of the disturbance 7 from the axis of the main transmission direction N, has in the measurement curve $A^1(t)$ recorded at the highest center frequency $f_1$=26 GHz the smallest maximum amplitude $A^1_D$ and in the measurement curve $A^3(t)$ recorded at lowest center frequency $f_3$=24 GHz the greatest maximum amplitude $A^3_D$. Conversely, the maxima $E_L$, $E_F$ attributable to the surface of the fill substance and to the container floor have, due to their on average over the breadths illuminated by the main lobe at the respective aperture angles $\alpha_n$, in each case, small distance x, in the measurement curve $A^1(t)$ recorded at the highest center frequency $f_1$=26 GHz the greatest maximum amplitude $A^1_L$, $A^1_F$ and in the measurement curve $A^3(t)$ recorded at the lowest center frequency $f_3$=24 GHz the smallest maximum amplitude $A^3_L$, $A^3_F$.

Since the main lobe of the radiation characteristic of the antenna 9, independently of the frequency of the signals, forms primarily rotationally symmetrically to the axis of the main transmission direction N, it is possible to deduce therefrom only the particular separation x per se, not, however, the spatial position of the respective reflector in the plane perpendicular to the axis of the main transmission direction N. It can thus not be determined, whether the disturbance 7 in the view of FIG. 1 is located in the left or in the right half of the plane of the drawing, respectively therebefore or therebehind.

The determining of the separations x occurs preferably numerically based on the normalized maximum amplitudes $A^1_D, A^2_D, A^3_D, A^1_L, A^2_L, A^3_L; A^1_F, A^2_F, A^3_F$ ascertained for this by the signal processing system 19 in digital form.

In the case of corresponding calibration, besides the above mentioned qualitative statements concerning the separations x, approximately also quantitative data concerning the separations x can be won.

The information obtained in the above described manner concerning the separations x of the individual reflectors can be used especially to make the associating of the individual maxima $E_D$, $E_L$, $E_F$ with corresponding reflectors, here the disturbance 7, the surface of the fill substance and the container floor, safe and reliable. Since disturbances 7 extend in fill level measuring arrangements always only laterally into the beam path and must not be located directly under the antenna 9 (in that case, a fill level measurement would in any event not be possible), based on the distance information, maxima $E_L$, $E_F$ attributed to reflections on the surface of the fill substance, respectively the container floor, can be reliably distinguished from maxima $E_D$ attributable to reflections on the disturbance 7.

This information can be automatically derived by the fill-level measuring device 5 by means of the signal processing system 19 and made available or directly further used.

Correspondingly, it is then possible based on the distance information to identify maxima $E_D$ of disturbances 7 located in the container 1, to ascertain the behavior of the measurement curves $A''(t)$ in the environment of the travel time $t_D$ at which the maximum $A_D$ attributed to the respective disturbance 7 occurs, and in the case of following fill-level measurings based on this information to perform the disturbance echo masking described above.

Figure 2:
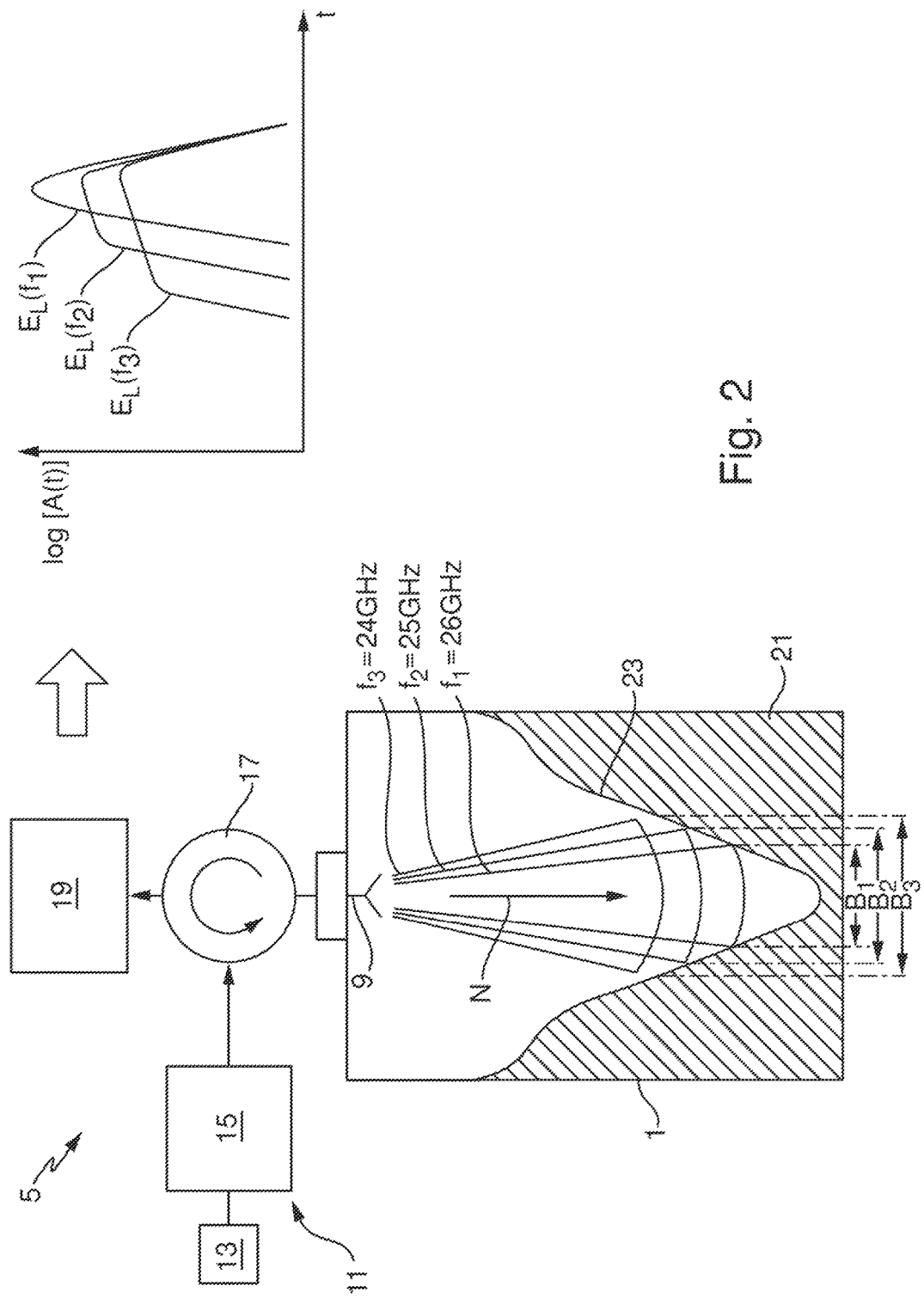
FIG. 2 is a fill level measuring arrangement with a fill-level measuring device equipped with a horn antenna, wherein a bulk good cone is located in the container.

Alternatively or supplementally to this, the possible associating of maxima to reflectors, now more reliable based on the distance information, can be applied for performing the above described echo tracking method. Thus, the fill-level measuring device can at the beginning of the echo tracking method automatically in an initial measuring cycle bring about a reliable associating of the individual maxima E of the measurement curves A(t) to the respectively associated reflectors. Moreover, the possible associating, more reliable based on the distance information, can be continuously applied for checking whether the associating of the individual maxima E of the measurement curves A(t) to the respective reflectors resulting from the echo tracking method is still correct FIG. 2 shows another fill level measuring arrangement with the fill-level measuring device 5 of the invention already described based on FIG. 1. The measuring arrangement differs from that illustrated in FIG. 1 only by the facts that no disturbance 7 is present and here a bulk good is provided as fill substance 21 that forms a bulk goods cone 23 in the container 1.

The bulk goods cone 23 has a cone longitudinal axis, which coincides with the axis of the main transmission direction N of the antenna 9.

Also here, according to the invention, measuring cycles are executed, which, in each case, comprise at least two measurings executed with transmission signals $S_n$ having different center frequencies $f_n$ of the therein contained microwave pulses. In the figure portion illustrated to the right of the receiving and evaluating circuit 19, by way of example, measurement curves $A''(t)$ registered at three different center frequencies $f_1$, $f_2$, $f_3$ are drawn next to one another in logarithmic representation. Also here, preferably in each measuring cycle measurings are executed at a clearly greater number of different center frequencies $f_n$. For better focus, FIG. 2 shows only a travel time range of the measurement curves $A''(t)$, in which the maxima $E_L(f_1)$, $E_L(f_2)$, $E_L(f_3)$ of the individual measurement curves $A''(t)$ attributable to reflection on the fill substance 21 occur.

Due to the different center frequencies $f_n$ used in the individual measurings and the therefrom resulting, different aperture angles $\alpha_n$ of the sent main lobes, the transmission signals $S_n$ illuminate, in each case, differently large cone inner breadths B1, B2, B3 extending concentrically to the main transmission direction N and to the longitudinal axis of the bulk goods cone 23. Accordingly, the maxima $E_L(f_n)$ of the individual measurement curves $A''(t)$ attributable to the reflections on the bulk good cone inner surface have an amplitude curve versus travel time range, which depends decisively on the bulk good cone shape, the center frequency dependent, aperture angle $\alpha_n$ of the main lobe N, and the transmission power of the antenna 9.

In this case, all measurings used the same transmission power, so that the radiation density striking the bulk good cone inner surface decreases with increasing aperture angle $\alpha_n$. This shows up immediately in the absolute values of the amplitudes A of the individual measurement curves $A''(t)$, and is preferably taken into consideration by the above described normalization of the individual measurement curves $A''(t)$.

Contained in the amplitude behavior of the measurement curves $A''(t)$ recorded at the selected different center frequencies $f_n$ is the information concerning the distances of the bulk good cone inner breadths from the fill-level measuring device 5 in the concentric breadths B1, B2, B3 respectively illuminated at the respective center frequencies $f_n$. This information can be derived, for example, based on the measurement curve $A^1(t)$ derived at the highest center frequency $f_1$ and differences between, in each case, two normalized measurement curves $A^{n+1}(t)$, $A^n(t)$ registered with neighboring center frequencies $f_{n+1}$, $f_n$.

The differences $\Delta_{n+1,n}$ are formed according to the formula:

$$\Delta_{n+1,n}(t) = A^{n+1}(t) - A^n(t).$$

Formulas of this type give the amplitudes of the signal fractions of the transmission signals $S_{n+1}$, which were reflected back toward the fill-level measuring device in an annular region $R_{n+1,n}$ lying outside of the breadth $B_n$ illuminated with the transmission signal $S_n$ of the higher center frequency $f_n$ and inside of the breadth $B_{n+1}$ illuminated with the transmission signal $S_{n+1}$ of the next lower center frequency $f_{n+1}$. Correspondingly, the differences $\Delta_{n+1,n}$ have, in each case, a maximum $M_{n+1,n}$ attributable to a reflection on the surface of the fill substance. The travel time $t_{\Delta n+1,n}$, at which this maximum $M_{n+1,n}$ occurs, corresponds to the average distance $d_{n+1,n}$, at which the bulk good cone inner surface in the associated outer annular region $R_{n+1,n}$ is separated from the fill-level measuring device 5.

Figure 3A:
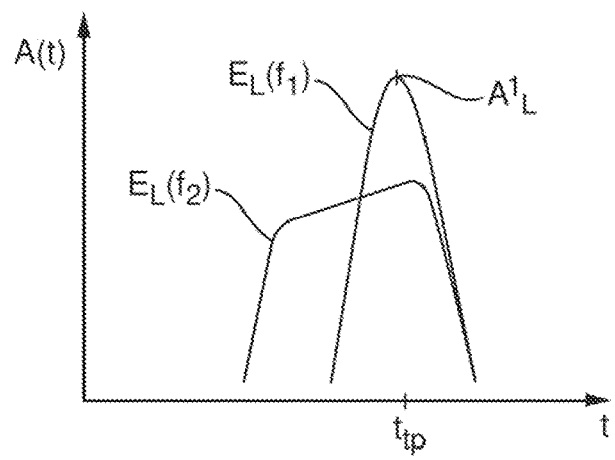
FIG. 3a measurement curves registered with the fill level measuring arrangement of FIG. 2 in the case of the highest and the next lower center frequencies in the travel time range of the maxima of the measurement curves attributable to reflection on the surface of the fill substance.

FIG. 3a shows, for this, by way of example, the measurement curves $A_1(t)$, $A_2(t)$ recorded at the highest center frequency $f_1$ and at the next lower center frequency $f_2$ in the travel time range of the maxima $E_L(f_1)$, $E_L(f_2)$ attributable to the reflection on the surface of the fill substance.

The measuring executed with the highest center frequency $f_1$ illuminates only a small region B1 of the cone tip. As a result, the travel time $t_{tip}$, at which the maximum $E_L(f_1)$ attributed to the reflection on the fill substance 3 has its maximum amplitude $A^1_L$, corresponds to the distance $d_1$ of the cone tip from the fill-level measuring device 5. From this, there results, based on the installed height of the fill-level measuring device 5 over the container 1, directly the fill level $L_1$ of the fill substance 21 at a separation of $x_1=0$ from the axis of the main transmission direction N, respectively the therewith coinciding, cone longitudinal axis.

In the case of the measurement curve derived with the next lower center frequency $f_2$, a slightly larger breadth B2 of the bulk goods cone 23 is illuminated. This slightly larger breadth B2 includes the breadth B1 having the cone tip. The difference $\Delta_{21}$ of the two normalized and scaled measurement curves $A^1(t)$, $A^2(t)$ contains, thus, information concerning the outer annular region $R_{21}$ of the breadth B2, which surrounds the breadth B1 externally and concentrically.

Figure 3B:
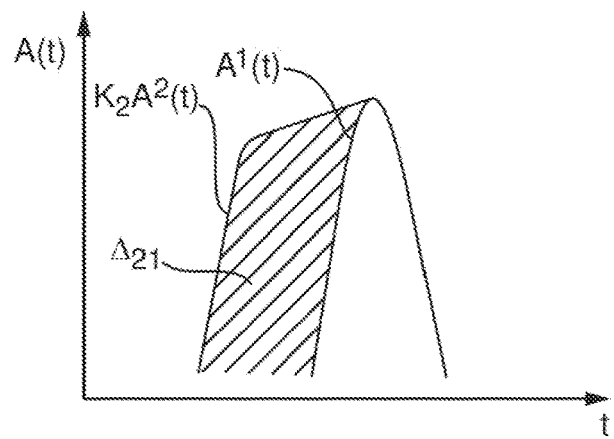
FIG. 3b the measurement curve of FIG. 3a registered at the highest center frequency together with the normalized measurement curve of FIG. 3a registered at the next lower center frequency.

The normalization can be performed, for example, in the manner shown in FIG. 3b by multiplying the logarithmic amplitudes A of all measurement curves recorded at lower center frequencies $f_n$, in each case, with a factor $k_n$, which is predetermined in such a manner that the maximum amplitudes $A^n_L$ of these measurement curves are equal to the corresponding maximum amplitude $A^1_L$ of the measurement curve $A^1(t)$ recorded with the highest center frequency $f_1$. FIG. 3b shows in logarithmic representation the measurement curve $A^1(t)$ registered with the highest center frequency $f_1$ and the corresponding normalized measurement curve $k_2 A^2(t)$ registered with the next lower center frequency $f_2$.

Figure 3C:
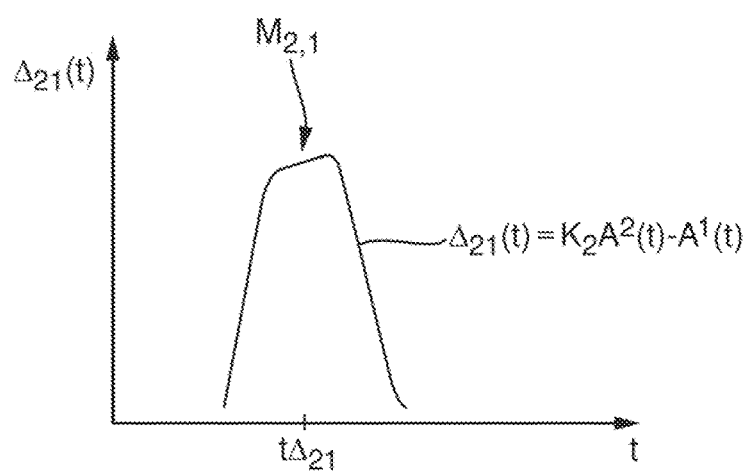
FIG. 3c the difference of the two measurement curves illustrated in FIG. 3b.

FIG. 3c shows the difference $\Delta_{21}$ of the two normalized logarithmic measurement curves. In the simplest case, then the travel time $t_{\Delta 21}$ of the maximum $M_{21}$ of the difference $\Delta_{21}$ is determined and an average distance $d_{21}$ of the outer annular region $R_{21}$ of the breadth B2 concentrically surrounding the breadth B1 from the fill-level measuring device 5 is calculated.

In the same manner, the differences $\Delta_{n+1,n}$ of all additional, frequency neighboring, normalized logarithmic measurement curves $A^n(t)$ are formed, and the travel times $t_{\Delta n+1,n}$ of the maxima $M_{n+1,n}$ of these differences $\Delta_{n+1,n}$ determined and the average distances $d_{n+1,n}$ of the outer annular regions $R_{n+1,n}$ of greater breadth $B_{n+1}$ concentrically surrounding the respectively smaller breadth $B_n$ from the fill-level measuring device 5 calculated.

Based on the frequency dependence of the aperture angle $\alpha_n$ of the main lobes at which the transmission signals $S_n$ were transmitted, an average transmission angle $\vartheta_{n+1,n}$ measured from the axis of the main transmission direction N can be associated with each annular region $R_{n+1,n}$, at which angle the associated transmission signals $S_n$ are sent from the antenna 9 to the annular region $R_{n+1,n}$. Based on the average distances $d_{n+1,n}$ and the associated average transmission angles $\vartheta_{n+1,n}$, then a profile of the bulk goods cone 23 can be derived. This is shown schematically in FIG. 4. The profile can be represented, for example, in the form of individual measurement points $L_1$, $L_{n+1,n}$, which, based on the respective transmission angles $\vartheta_{n+1,n}$, the distances $d_{n+1,n}$ derived based on the travel times $t_{\Delta n+1,n}$ and the installed height of the antenna 9 relative to the container 1, reflect the fill levels $L_{n+1,n}$ as a function of the respective horizontal separations $x_{n+1,n}$ from the cone axis.

Resulting for the measurement point $L_1$ recorded with the highest center frequency $f_1$ is a horizontal separation $x_1$ of zero, and the fill level $L_1$ corresponds to the difference between the installed height of the fill-level measuring device 5 and the distance $d_1$ determined based on the travel time $t_{tip}$.

For all remaining measurement points $L_{n+1,n}$ derived based on the differences $\Delta_{n+1,n}$ of measurement curves $A^{n+1}(t)$, $A^n(t)$ registered with respectively neighboring center frequencies $f_{n+1}$, $f_n$, the horizontal separation $x_{n+1,n}$ is given, in each case, by the product of the sine of the associated average transmission angle $\vartheta_{n+1,n}$ and the distances $d_{n+1,n}$ derived from the travel time $t_{n+1,n}$ of the maximum $M_{n+1,n}$ of the difference $\Delta_{n+1,n}$.

$$x_{n+1,n}=\sin(\vartheta_{n+1,n})d_{n+1,n}$$

The associated fill levels $L_{n+1,n}$ equal the difference between the installed height H of the fill-level measuring device 5 and the product of the cosine of the associated average transmission angle $\vartheta_{n+1,n}$ and the separations $d_{n+1,n}$ derived from the travel time $t_{n+1,n}$ of the maximum $M_{n+1,n}$ of the difference $\Delta_{n+1,n}$.

$$L_{n+1,n}=H-\cos(\vartheta_{n+1,n})d_{n+1,n}$$

Already a coarse profile of the bulk good height in the container 1 is given via the measurement points obtained by the fill levels $L_{n+1,n}$ and the respectively associated separations $x_{n+1}$ from the axis of the main transmission direction N. Preferably, the won measurement points are subjected to an additional conditioning, especially by interpolation, filtering, smoothing, and/or curve fitting, in order to yield a refined profile reflecting fill level (L(x)) as a function of separation (x).

Preferably, the won—coarse or continuous—profile is examined for the presence of kinks or jumps of fill level L as a function of separation x.

A sharp bend or jump arises, for example, when a disturbance protrudes laterally inwardly into the container 1 and, thus, reflects a signal portion of the respective transmission signal $S_n$ in measurings executed at lower center frequencies $f_n$. Since bulk goods regularly form continuous surface profiles, a sharp bend or jump is usually a reliable indication of the presence of a disturbance. Correspondingly, a correction of the obtained profile can be performed in this regard by removing the sharp bend or jump, for example, by numerical methods, especially interpolation, smoothing or function fitting with a higher weighting of measurement points lying outside of the sharp bend- or jump region. This correction is especially advantageous when subsequently based on the profile a volume of the fill substance 21 located in the container 1 is to be calculated.

The above described methods are applicable completely analogously also in applications, in the case of which instead of the here illustrated valley shaped bulk goods cone a hill shaped bulk goods cone forms, whose longitudinal axis coincides with the axis of the main transmission direction N.

So long as the longitudinal axis of the bulk goods cone coincides with the axis N of the main transmission direction, the fill-level measuring device 5 is able, based on the directionally dependent distances d of the cone surface from the fill-level measuring device 5 determined in the above described manner, automatically to detect, whether a bulk goods cone is hill or valley shaped. In the case of valley shaped bulk good cones, the distance decreases with increasing angle of the respective transmission direction from the principle transmission axis N, while in the case of hill shaped bulk good cones it increases.

Moreover, they are naturally applicable completely analogously also in other applications, in which the fill substance forms a surface extending essentially rotationally symmetrically to the axis of the main transmission direction N.

In applications, in which the fill substance does not form a surface extending essentially rotationally symmetrically to the axis of the main transmission direction N, preferably pulse radar-fill level measuring devices 25 embodied according to a second variant of the invention are applied, which have an antenna 27, which transmits the above described transmission signals $S_n$, in each case, with a spatial radiation characteristic dependent on its center frequency $f_n$ and different for different center frequencies $f_n$, with a main transmission lobe, whose spatial orientation depends on the center frequency $f_n$ of the transmission signals $S_n$ and is different for different center frequencies $f_n$.

Figure 5:
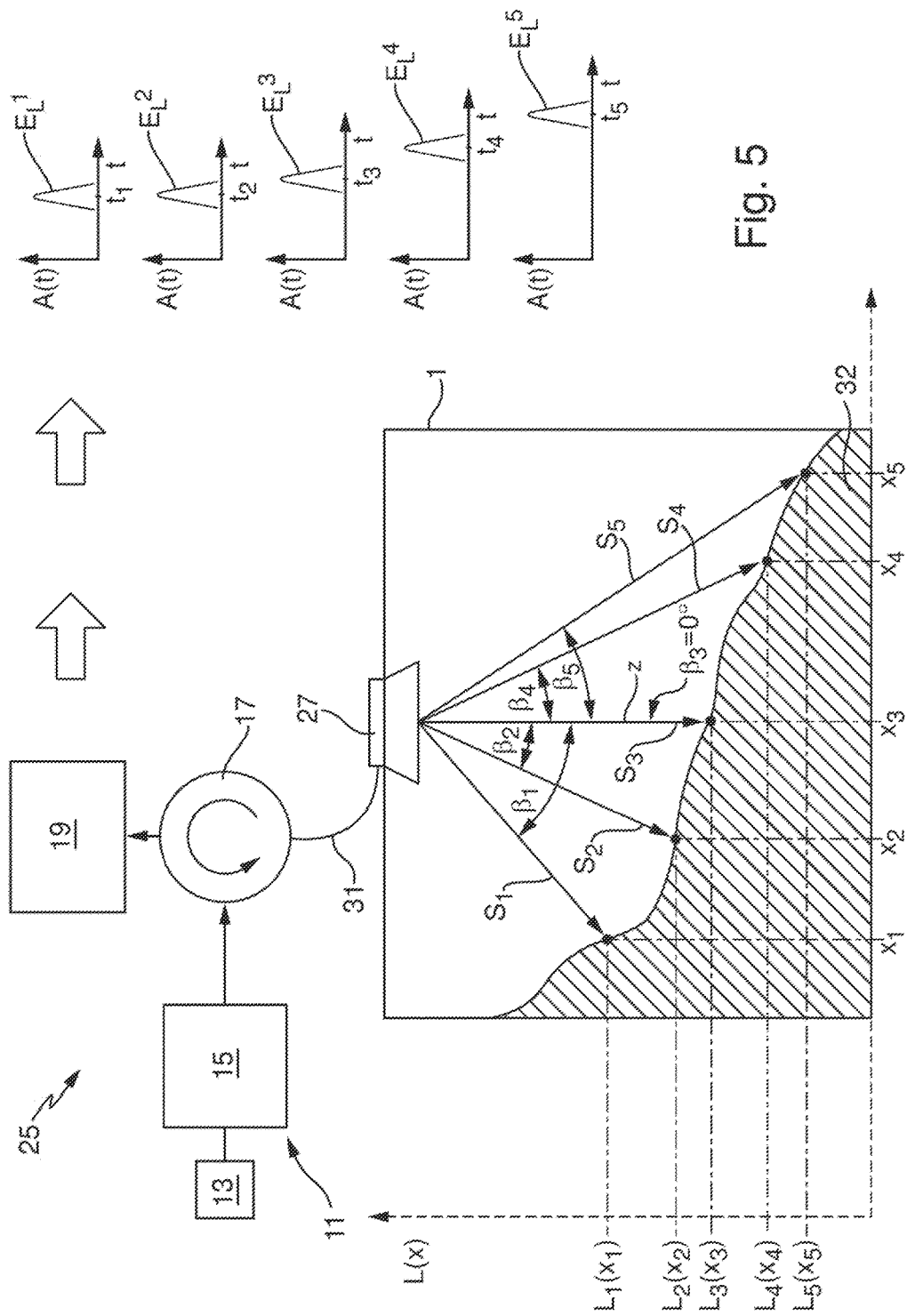
FIG. 5 is a fill level measuring arrangement with a fill-level measuring device equipped with a terminally reflection freely closed, hollow conductor, slot antenna, wherein the fill substance forms a hill protruding laterally into the field of vision of the antenna.

FIG. 5 shows a fill level measuring arrangement equipped with such a fill-level measuring device 25. In this case, there is located in the container 1 under the antenna 27 a fill substance 32 that forms the side of a hill in the field of vision of the antenna 27.

The fill-level measuring device 25 can, apart from the antenna 27 and the differences described below in detail resulting from the radiation characteristic of the antenna 27, have basically the same construction as the fill level measuring devices 5 illustrated in FIGS. 1 and 2. Thus, also fill-level measuring device 25 includes a transmission system 11, which includes connected to a control unit 13 a pulse producing system 15, which is embodied in such a manner that in measurement operation it produces, in a predetermined measuring cycle comprising a number of measurings, the above described transmission signals $S_n$ of microwaves of center frequency $f_n$ predetermined for the particular measuring. In such case, the center frequencies $f_n$ lie, also here, preferably in the above frequency ranges mentioned as preferable in conjunction with the earlier described examples of embodiments.

Also here again measuring cycles are performed, which comprise at least two measurings, in which the center frequencies $f_n$ of the microwave pulses of the associated transmission signals $S_n$ are different. The transmission signals $S_n$ are also here transmitted to the antenna 27 via a transmitting/receiving separator, or directional coupler, 17 connected to the transmission system 11, and their signal fractions reflected back in the container 1 in the direction of the antenna 27 fed via the transmitting/receiving separator, or directional coupler, 17 to a receiving and evaluating unit 19, which based on the received signals $R_n$, in each case, derives a measurement curve $A_n(t)$, which shows the amplitude of the received signals $R_n$ as a function of travel time t.

In order also here to achieve a comparability of the measurement curves $A_n(t)$ derived in the individual measurings of the measuring cycles, the amplitudes A of the measurement curves $A_n(t)$ are given the above described normalization, and the measurement curves $A_n(t)$, in case required, referenced to the same time scale by subsequent scalings.

The antenna 27 is preferably a correspondingly embodied, hollow conductor, slot antenna. Hollow conductor slot antennas are known from the state of the art. According to the invention, here, hollow conductor, slot antennas are used, which are embodied in such a manner that they have radiating characteristics with one or two, dominant, main lobes, whose spatial orientation depends on the center frequency $f_n$ of the respectively sent transmission signal $S_n$ and is different for different center frequencies $f_n$.

Figure 6:
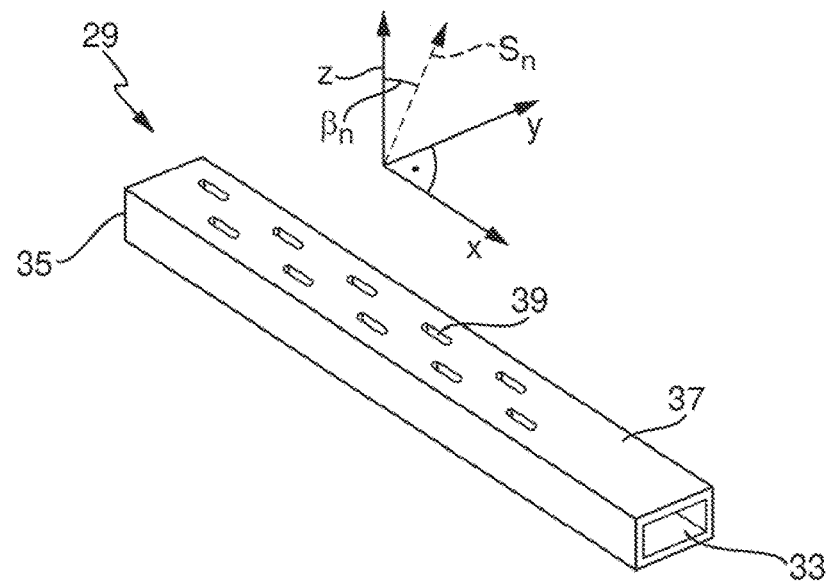
FIG. 6 is a rectangular, hollow conductor of a hollow conductor, slot antenna.

Suited for this is especially a hollow conductor, slot antenna, which includes a rod-shaped, rectangular, hollow conductor 29 as illustrated in FIG. 6. Rectangular, hollow conductor 29 has an input 33 fed from the transmission system 11 via a feed line 31. The end 35 of the rectangular, hollow conductor 29 lying opposite the input 33 is selectively either terminally short circuited, open, or terminated with a reflection free termination.

Rectangular, hollow conductor 29 includes a rectangular, external, hollow conductor wall 37, which is provided with slot shaped, slot like or fractal shaped cutouts 39, via which the antenna 27 sends the supplied transmission signals $S_n$ with a spatial outgoing radiation characteristic dependent on the positioning and dimensioning of the cutouts 39 and the center frequencies $f_n$ of the supplied transmission signals $S_n$.

Antenna 27 is mounted in such a manner above the container 1 that a surface normal Z to the outside of the hollow conductor wall 37 points in the container 1 toward the fill substance 32.

Structurally related, the radiation characteristic of the antenna 27 has parallel to the longitudinal axis of the rectangular, hollow conductor 29 a stronger focusing than perpendicular thereto. The spatial direction parallel to the longitudinal axis of the rectangular, hollow conductor 29 is assigned the X direction, and the spatial direction extending perpendicular thereto is called the Y direction.

Figure 7:
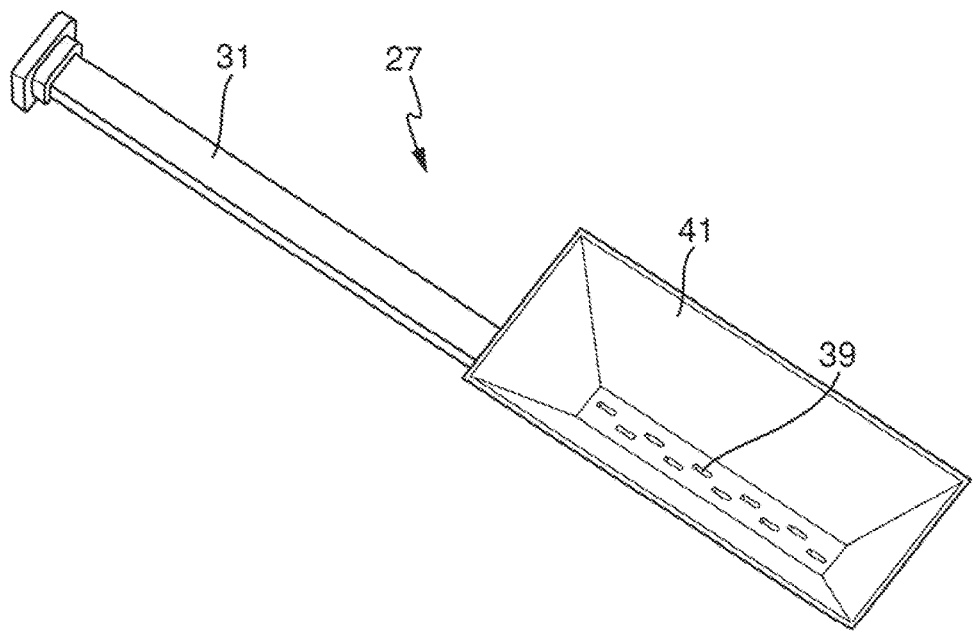
FIG. 7 a hollow conductor, slot antenna having a rectangular, hollow conductor and a thereon mounted, hollow conductor segment.
Figure 8:
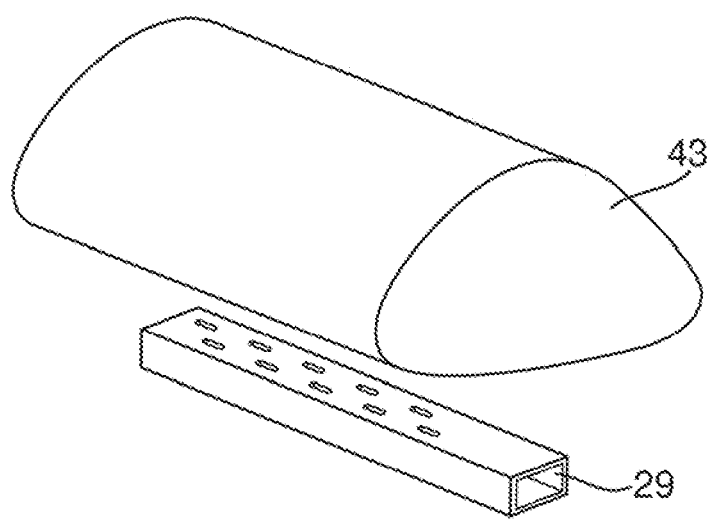
FIG. 8 a rectangular, hollow conductor of a hollow conductor, slot antenna in combination with a dielectric lens.

For additional focusing of the transmission signals $S_n$ sent from the antenna 27 toward the fill substance 32 in the spatial direction Y, the antenna is 27 preferably equipped with a focusing apparatus arranged on the outside of the hollow conductor wall 37 facing the container interior. FIGS. 7 and 8 show respective examples of embodiments for this. In the example of an embodiment shown in FIG. 7, the focusing apparatus is a hollow conductor segment 41 enclosing all cutouts 39 and having the shape of a rectangular funnel uniformly widening toward the container 1. Alternatively, also a rectangular hollow conductor segment can be applied. Hollow conductor segment 41 simultaneously provides focusing in spatial direction X.

Alternatively or supplementally, the focusing apparatus can be a lens alone or arranged over the hollow conductor wall 37. FIG. 8 shows an example of such an embodiment, in the case of which a dielectric lens 43 is provided over the rectangular, hollow conductor 29.

Another form of embodiment (not shown) of a usable focusing apparatus is provided by plates of one or more planar plies of a dielectric material applied outwardly of the cutouts 39.

Alternatively, also a magnetic lens can be applied, which has an apparatus arranged in the direction of the outwardly pointing surface normal Z in front of the rectangular, hollow conductor 29 for producing a magnetic field effecting corresponding focusing.

Alternatively, the focusing apparatus can also comprise other rectangular, hollow conductors embodied identically to the rectangular, hollow conductor 29, and connected with the rectangular, hollow conductor 29 to form a group of parallel, equal amplitude- and phase fed, rectangular, hollow conductors extending parallel to one another and arranged directly next to one another perpendicularly to the longitudinal axis of the rectangular, hollow conductor 29.

For achieving a center frequency dependent orientation of the main lobes of the antenna 27, the rectangular, hollow conductor 29 is equipped preferably with two rows of cutouts 39 arranged one after the other, in each case, on lines extending parallel to the longitudinal axis of the rectangular, hollow conductor 29 on the hollow conductor wall 37. The two rows extend with the same separation Δy from the center of the hollow conductor wall 37.

An example of such a hollow conductor, slot antenna designed for operation at a fixedly predetermined, single frequency is described in the article, "Integrated Waveguide Slot Antennas" of the authors, A. J. Farrall and P. R. Young, of 5 Aug. 2004, Vol. 40, No. 16 of the journal ELECTRONICS LETTERS.

Figure 9:
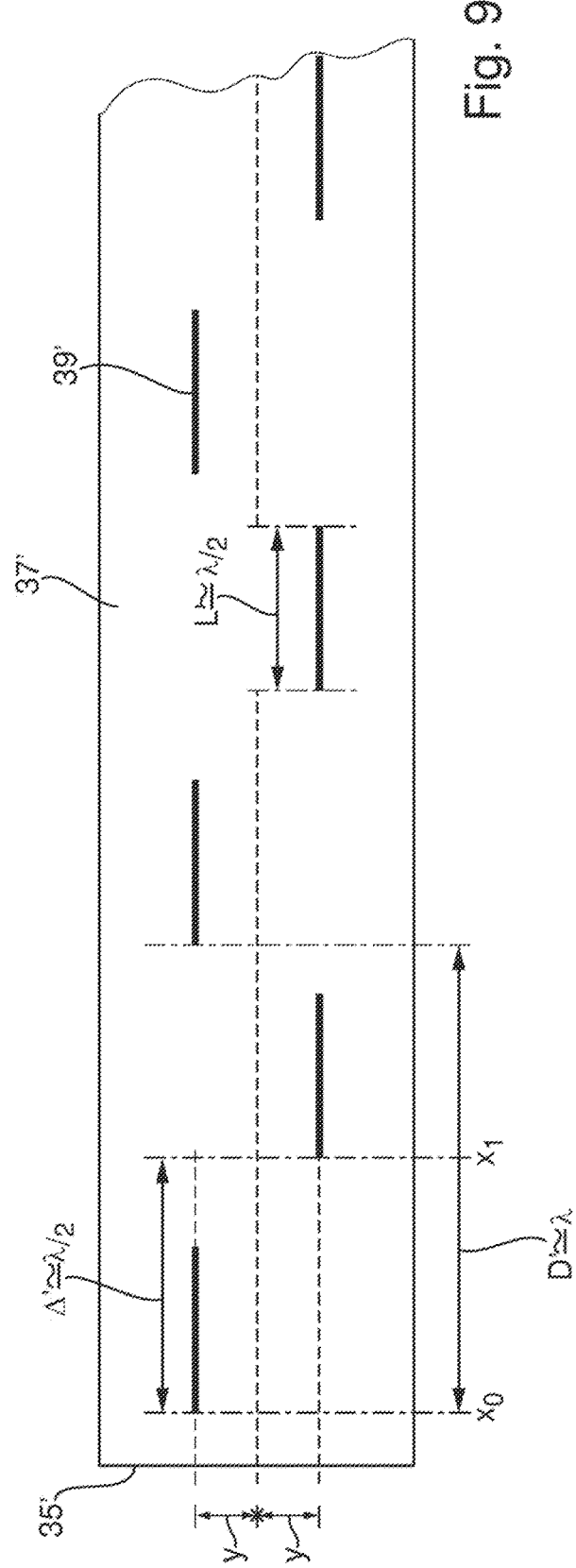
FIG. 9 dimensioning and positioning of slot shaped cutouts of a hollow conductor, slot antenna designed for a predetermined frequency.

FIG. 9 shows, for purposes of explanation, a design example for a single, predetermined, transmitted frequency f. Electromagnetic waves of this frequency f form in the rectangular, hollow conductor 29' a wavelength λ dependent on the dimensions of the rectangular, hollow conductor 29' and the medium located therein. A separation ΔY of the rows from the center of the hollow conductor wall 37' is equal for the two rows and is preferably determined based on the location dependence of the shunt-conductivity of the rectangular, hollow conductor 29' in the Y direction—thus perpendicular to the longitudinal axis of the rectangular, hollow conductor 29'—in such a manner that as much power as possible is radiated through the cutouts 39'. This is the same as saying that the waves in the cutout region forming in the rectangular, hollow conductor 29' form a wave peak.

In each of the two rows, the individual cutouts 39' are arranged periodically one after the other at a separation D of a wavelength λ, and the cutouts 39' of the two rows are arranged offset relative to one another in the longitudinal direction of the rectangular, hollow conductor 29' by an offset Δ' of a half wavelength λ/2. In such case, the cutout 39' of the one row nearest to the open, short-circuited or reflection free, closed end 35' of the rectangular, hollow conductor 29 lying opposite the input end 33 is spaced from the end 35' of the rectangular, hollow conductor 29' by a certain separation $x_0$ as a function of the type of termination. The separation $x_0$ amounts in the case of open end 35' preferably to a half wavelength, i.e. $x_0 = \lambda/2$. In the case of a short-circuited end 35' the separation $x_0$ amounts to preferably a fourth wavelength, i.e. $x_0 = \lambda/4$. In the case of reflection free termination of the end 35', any separation $x_0$ can be used, since in such case no reflection of the supplied transmission signals $S_n$ on the reflection free closed end 35' occurs. If the termination cannot be embodied sufficiently reflection free, the type of reflection depends on the manner of construction of the termination and the length $x_0$ can be matched to such a situation, for example, by calculation or numerical simulation.

Due to the offset Δ' of the two rows by a half wavelength λ/2, the corresponding separation $x_1$ of the first cutout 39' of the other row from the end 35' of the rectangular, hollow conductor 29' is equal to the sum of the separation $x_0$ and the offset Δ'. In the case of an open end 35', the separation $x_1$ amounts, thus, to three-quarter wavelength ¾ λ. All cutouts have the same length L', which lies in the order of magnitude of a half wavelength λ/2 and is significantly smaller than the offset Δ' for preventing an overlapping of the cutouts 39' in the longitudinal direction of the rectangular, hollow conductor 29'.

Figure 10:
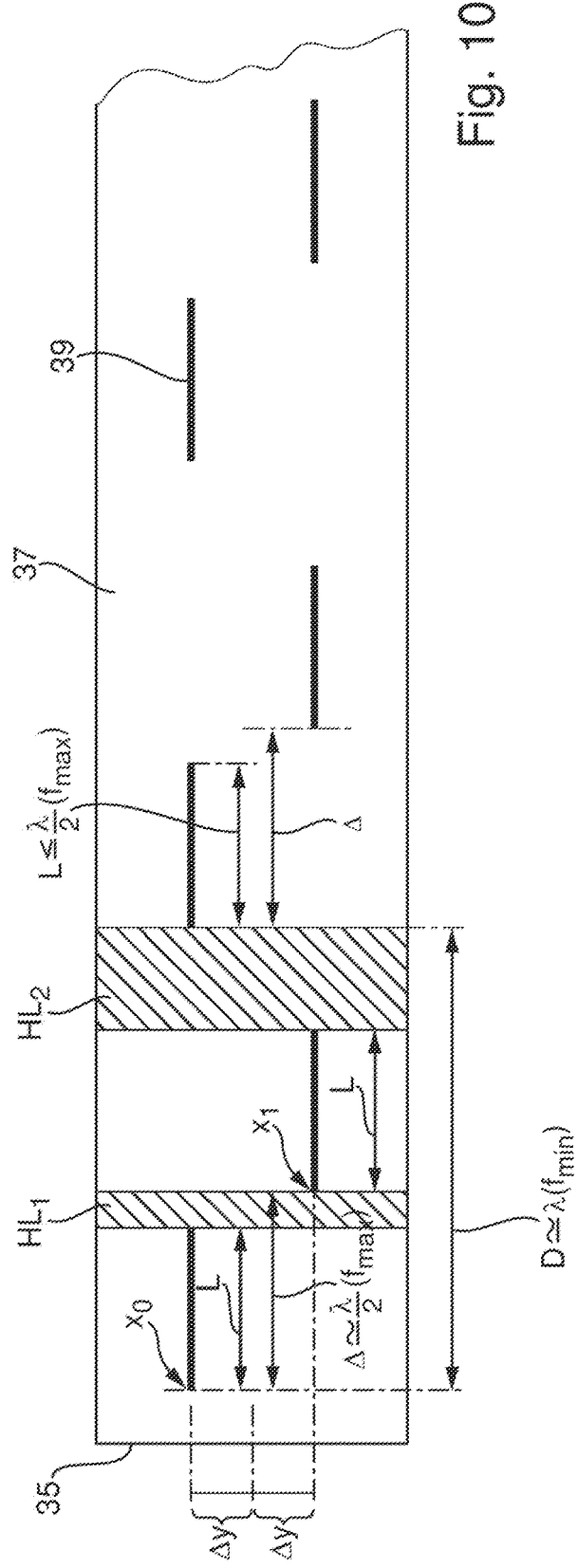
FIG. 10 dimensioning and positioning of slot shaped cutouts of a hollow conductor, slot antenna designed for a spectrum of center frequencies.

The positioning and dimensioning of the cutouts 39 of the antenna 27 of the invention for sending or for sending and receiving signals of different center frequency is shown in FIG. 10. The design is obtained based on the above description of the dimensioning and positioning of the cutouts for a single frequency f, taking into consideration the spectrum of the center frequencies $f_n$ to be applied according to the invention, as bounded by a lower limit frequency $f_{min}$ and an upper limit frequency $f_{max}$.

Also the hollow conductor, slot antenna 27 of the invention has two rows of cutouts 39 of equal lengths L extending parallel on both sides of the longitudinal axis of the rectangular, hollow conductor 29.

The separation ΔY of the two rows from the center of the hollow conductor wall 37 is also determined here based on the location dependence of the shunt-conductivity in the direction Y—thus perpendicular to the longitudinal axis of the rectangular, hollow conductor—in such a manner that as much power as possible is radiated through the cutouts 39.

Both rows are identical relative to the shape and separations of the therein sequentially following cutouts 39, but are offset relative to one another in the longitudinal direction of the rectangular, hollow conductor 29 by an offset Δ, which lies in the order of magnitude of half of the wavelength $\lambda(f_{max})$ forming in the rectangular, hollow conductor 29 at the upper limit frequency $f_{max}$, i.e.

$\alpha \approx \frac{1}{2} \lambda(f_{max})$. If the first cutout 39 of the one row nearest to the end 35 of the rectangular, hollow conductor 29 lying opposite the feed line 31 begins at a separation $x_0$ from this end 35, then the first cutout 39 of the other row nearest the end of the rectangular, hollow conductor 29 begins at a separation $x_1$ from the end, wherein $x_1$ equals the sum of the separation $x_0$ and the offset Δ. The separation $x_0$ is also here to be determined as a function of the choice of the termination of the end 35. Preferably, the separation $x_0$ lies at short-circuited end 35 in the order of magnitude of a fourth of the wavelength $\lambda(f_{min})$ forming at the lower limit frequency $f_{min}$, i.e. $x_0 \approx \frac{1}{4} \lambda f_{min})$. In the case of open end 35, it lies preferably in the order of magnitude of half of the wavelength $\lambda(f_{min})$ forming at the lower limit frequency $f_{min}$ in the rectangular, hollow conductor 29; i.e. $x_0 = \frac{1}{2} \lambda(f_{min})$. In the case of reflection free termination of the end 35, the separation $x_0$ can be as much as desired. If the termination cannot be embodied sufficiently reflection free, the type of reflection depends on the manner of construction of the termination and the length $x_0$ can be matched thereto, for example, by calculation or numerical simulation.

In each row, the cutouts 39 follow one another periodically at a period distance D, which lies in the order of magnitude of the wavelength $\lambda(f_{min})$ forming at the lower limit frequency $f_{min}$, i.e.

$D \approx \lambda(f_{min})$

The length L of the cutouts 39 lies in the order of magnitude of half of the wavelength $\lambda(f_{max})$ forming in the rectangular, hollow conductor 29 at the upper limit frequency $f_{max}$ and is significantly smaller than the offset Δ, i.e.

$L \approx \lambda(f_{max})/2 < \Delta$

Preferably, there is predetermined for the length L as a function of the manufacturing tolerances a maximum value, in the case of which, in spite of the manufacturing tolerances it is still assured that the length L is significantly smaller than the offset Δ. In this way, it is achieved that cutouts 39 of the one row in the longitudinal direction do not overlap with the respectively following cutout 39 of the other row.

The exact values for the length L of the cutouts 39, the period distance D, offset Δ and the separations $x_0$, $x_1$ from the end 35 are preferably determined by an optimizing performed based on numerical simulation calculations, preferably taking into consideration also a minimum phase offset related to the different signal propagation velocities within and outside of the rectangular, hollow conductor 39.

While the offset Δ is determined according to the invention based on the shorter wavelength $\lambda(f_{max})$ of the upper limit frequency $f_{max}$, the period distance D is determined according to the invention based on the longer wavelength $\lambda(f_{min})$ of the lower limit frequency $f_{min}$. Accordingly, a cutout free hollow conductor segment HC1 following the cutout end of the respectively first of two cutouts 39 of the two rows displaced relative to one another by the offset Δ is, moreover, dependent on the length L of the cutouts 39, shorter than a cutout free hollow conductor segment HC2 following the cutout end of the respectively second of the two cutouts 39 of the two rows displaced relative to one another by the offset Δ. For illustration, this is shown in FIG. 10 by the crosshatching of the shorter hollow conductor segment HC1 relative to the crosshatching of the longer hollow conductor segments HC2.

Therewith, the period distance D for transmission signals $S_n$, whose center frequency $f_n$ lie near the lower limit frequency $f_{min}$, is well matched, while the length L of the cutouts 39 is somewhat too small for this, and in the longitudinal direction each second cutout 39 is located in the wrong position. This effects in the case of short-circuited or open termination of the end 35 two main lobes, with an orientation differing from the surface normal Z by a center frequency dependent angle $β_n$. In the case of reflection free termination of the end 35 only one main lobe forms, with an orientation differing from the surface normal Z by a center frequency dependent angle $β_n$.

For transmission signals $S_n$, whose center frequency $f_n$ lies near the upper limit frequency $f_{max}$, in contrast, the offset Δ is well matched. Moreover, the longer cutout free hollow conductor segment HC2 adjoining the cutout end of the respectively second of two cutouts 39 displaced by the offset Δ relative to one another, as well as the magnitude by which the length L of the cutouts 39 subceeds the length optimally matched to the particular center frequency $f_n$, effect in this region both within the rectangular, hollow conductor 29 as well as also at the forming of the radiating wavefront a phase shifting, so that a focusing of the radiated wavefront into a single main lobe directed parallel to the surface normal Z occurs.

In the case of an antenna 27 with a rectangular, hollow conductor 29 with reflection free closed end 35, a part of the supplied transmission signals $S_n$ is sent via the cutouts 39 toward the fill substance 33. In the case of the above described dimensioning and positioning of the cutouts 39, the antenna 27 has, in this case, a radiation characteristic with a single dominant main lobe, which forms at an angle $β_n$ relatively to the surface normal Z in the plane defined by the surface normal Z and the spatial direction Y as a function of the center frequency $f_n$ of the microwave pulses of the respectively sent transmission signal $S_n$.

This form of embodiment with reflection free closed, rectangular, hollow conductors 29 was applied in the case of the example of an embodiment illustrated in FIG. 5. Shown there are the directions of the individual main lobes, as well as the angle βn at which they form relative to the surface normal Z, by way of example, for five sequentially executed measurings at different center frequencies $f_n$.

In the case of each of the measurings sequentially executed at the associated center frequency $f_n$, in each case, the transmission signal $S_n$ composed of microwave pulses of center frequency $f_n$ predetermined for the particular measuring by means of the control unit 13 is sent, its associated received signal $R_n$ received, and, based on the received signal $R_n$, a measurement curve $A_n(t)$ derived, which shows the amplitude $A_n(t)$ of the respective received signal $R_n$ as a function of associated signal travel time t. Also here, the measurement curves $A_n(t)$ are preferably normalized and scaled in the above described manner. The sequentially derived measurement curves $A_n(t)$ at the different center frequencies $f_n$ are shown in FIG. 5 to the right of the receiving and evaluating circuit 19. In each of these measurement curves $A_n(t)$, in each case, the therein contained marked maximum $E''_L$ attributed to the reflection on the surface of the fill substance is ascertained, and the travel time $t''_L$ at which it has its maximum amplitude determined. The travel times $t''_L$ correspond, in each case, to the distance $d_n$ of the fill-level measuring device 25 from the surface of the fill substance in the direction of the main lobe of the outgoing radiation characteristic of the antenna 27 forming at the respective center frequencies $f_n$.

Based on the travel times $t''_L$ of these maxima $E''_L$, the center frequencies $f_n$ of the associated transmission signals $S_n$ based on which the particular travel time $t''_L$ was determined, and the angles $β_n$ at which the main transmission lobe at the respective center frequencies $f_n$ extends relative to the surface normal Z, a profile of the surface of the fill substance can then be directly determined.

Analogously to the example of an embodiment described based on FIG. 2, the profile can also here be expressed, for example, in the form of individual measurement points $L_n(x_n (β_n, d_n(t_n))$, which reflect the fill levels $L_n$ determined based on the respective angle $β_n$, the separations $d_n$ derived based on the travel times $t_n$ and the position and the installed height of the antenna 27 relative to the container 1 as a function of the respective horizontal separations $x_n$ from the surface normal Z to the antenna 27.

Figure 4:
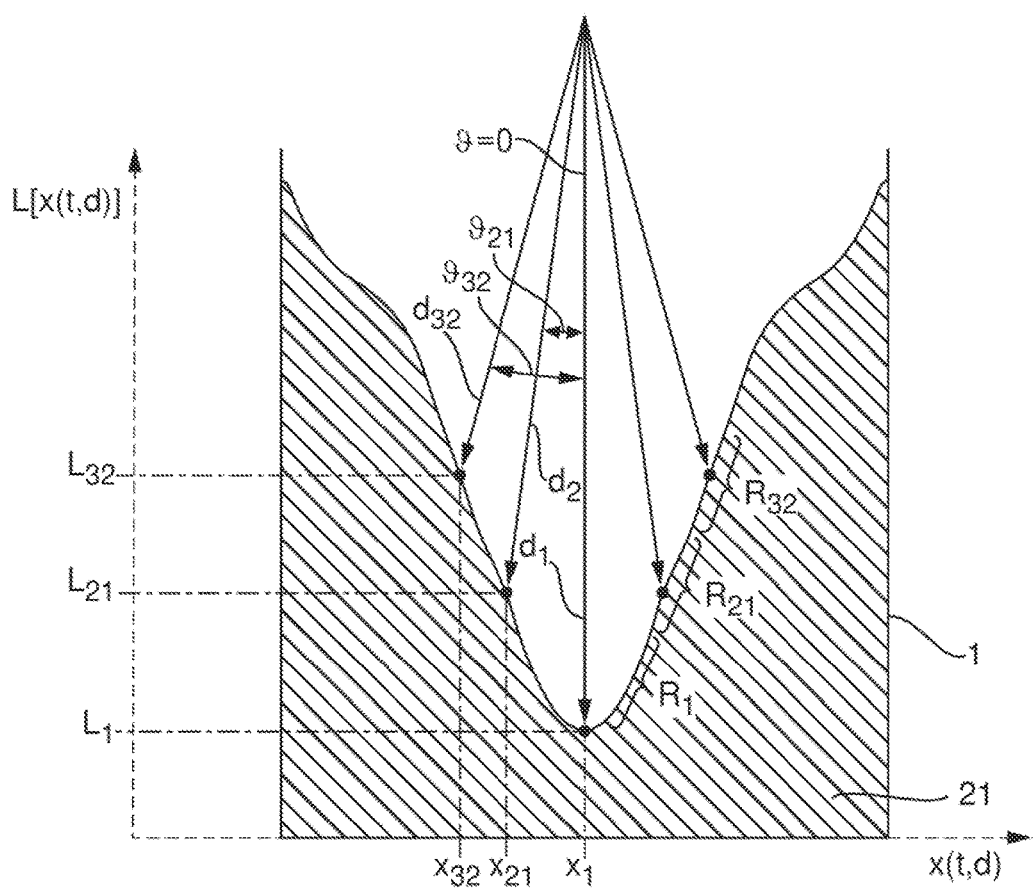
FIG. 4 the container of FIG. 2 together with measurement points of a profile of the surface of the fill substance produced with the measuring arrangement of FIG. 2.

Also here, based on the further processing of the measurement points $L_n(x_n (β_n, d_n(t_n)))$ described above in conjunction with the form of embodiment described based on FIGS. 2 and 4, especially by interpolation, filtering, smoothing or function fitting, a continuous profile of the surface of the fill substance can be created, which then is available for additional evaluation and/or processing.

The form of embodiment shown in FIG. 5 offers the advantage that it also can be applied in applications, in which earlier no data concerning the geometry of the surface of the fill substance are known. Especially, it is also applicable, when the fill substance—such as in the example of an embodiment illustrated in FIG. 5—has a surface geometry, which does not extend symmetrically to the surface normal Z.

The antenna 27 of the invention equipped with a terminally reflection free closed, rectangular, hollow conductor 29 is, thus, not only applicable in fill level measuring arrangements, in which the fill substance is located in a closed container, but, instead, can, for example, also be applied in fill level measuring arrangements, in the case of which the fill level to be measured is a fill height profile developing perpendicular to the travel direction of a conveyor belt on the conveyor belt.

This form of embodiment of the fill-level measuring device 25 of the invention can, of course, also be applied in applications with planar or rotatonally symmetric surface of the fill substance, in which, for example,—such as shown in the example of application of FIG. 1—disturbances 7 protruding laterally into the container 1 are present, or in which the fill substance in the container 1—such as shown in the example of application of FIG. 2—forms a bulk goods cone 23 located preferably directly under the antenna 27.

Figure 11:
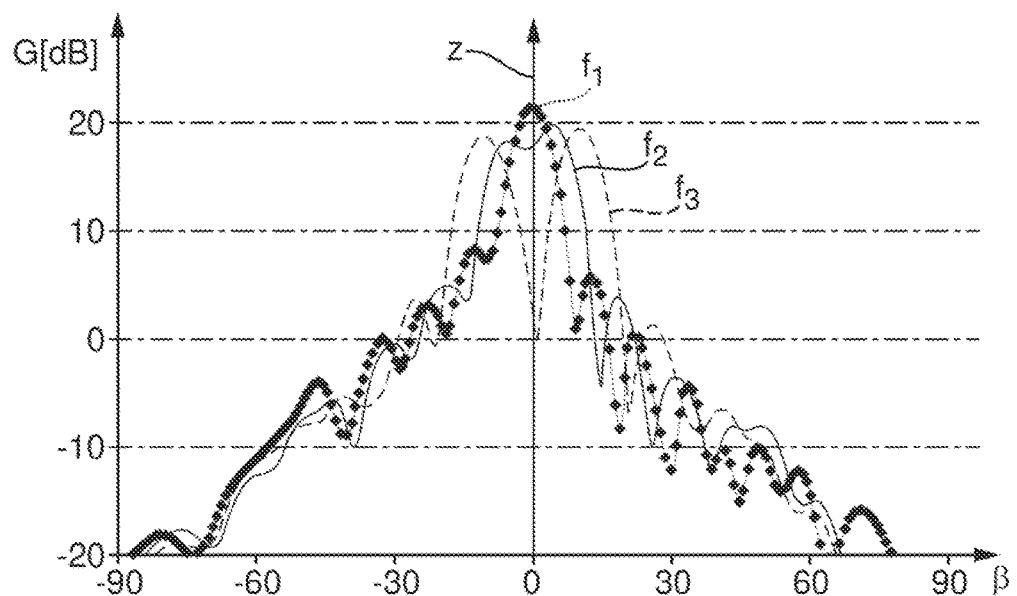
FIG. 11 is an antenna diagram of the hollow conductor, slot antenna of FIG. 10 with terminally short-circuited, rectangular, hollow conductor.

Alternatively to the example of a hollow conductor, slot antenna having an open end 35 described based on FIG. 5, also a hollow conductor, slot antenna having a short-circuited or open end 35 can be used. In both cases, both a part of the supplied transmission signals $S_n$ as well as also a part of the fraction of the respective transmission signal $S_n$ reflected back to the short-circuited or open end 35 are sent through the cutouts 39 toward the fill substance. The single difference between these two variants is that the reflection on the open end 35 occurs phase-shifted relative to the reflection caused by a short circuit. In both cases, the antenna 27 has a radiation characteristic with two main lobes, whose transmission directions extend to both sides of the surface normal Z, in each case, at the same center frequency dependent angle $\beta'_n$ from the surface normal Z, and only coincide to a single main lobe at a center frequency dependent angle $\beta'=0°$ of zero degree. FIG. 11 shows, as an example of this, an antenna diagram of an antenna 27 with terminally short-circuited, rectangular, hollow conductor 29. FIG. 11 shows an antenna gain G as a function of transmission direction for transmission signals $S_n$ of three different center frequencies $f_n$. The transmission direction is given here by the angle $\beta'$, which the transmission direction forms with the surface normal Z to the hollow conductor wall 37 in the plane defined by the surface normal Z and the spatial direction Y. The highest illustrated center frequency $f_1$ results in a single main lobe extending at an angle $\beta'$ of 0° from the surface normal Z. The next lower center frequency $f_2$ forms in the plane defined by the surface normal Z and the spatial direction Y two main lobes extending symmetrically to the surface normal Z at an angle $\beta_2'$ of about +/−7° from the surface normal Z. The lowest illustrated center frequency $f_3$ forms in the plane defined by the surface normal Z and the spatial direction Y two main lobes extending symmetrically to the surface normal Z at an angle $\beta_3'$ of about +/−15° from the surface normal Z.

Due to the geometry and the symmetry of the resulting main lobe pairs, also this form of embodiment is subject to limitations as regards its applications. These correspond basically to the limitations, which hold for the forms of embodiment described with reference to FIGS. 1 and 2.

Differences exist only insofar as the main lobes in the case of the forms of embodiment shown in FIGS. 1 and 2 are rotationally symmetric to always the same main transmission direction Z, while the two main lobes of a terminally open or short-circuited hollow conductor, slot antenna form symmetrically in a plane to both sides of the surface normal to the rectangular, hollow conductor.

LIST OF REFERENCE CHARACTERS 1 container
3 fill substance
5 fill-level measuring device
7 disturbance
9 antenna
11 transmission system
13 control unit
15 pulse producing system
17 transmitting/receiving separator, directional coupler
19 signal processing system
21 fill substance
23 bulk goods cone
25 fill-level measuring device
27 antenna
29 rectangular, hollow conductor
31 feed line
32 fill substance
33 input
35, 35' end of rectangular, hollow conductor
37, 37" hollow conductor wall
39, 39' slot shaped cutout
41 hollow conductor segment
43 lens

The invention claimed is:

1. A fill-level measuring device working according to the pulse radar principle for measuring a fill level of a fill substance in a container, comprising:

a transmission system having a pulse producing system, connected to a control unit, which is embodied in such a manner that, in predetermined measuring cycles comprising, in each case, at least two measurements, for each measurement, it produces a transmission signal composed of microwave pulses of a center frequency predetermined for the particular measuring, wherein the center frequencies of the transmission signals of at least two of the measurings are different from one another;

an antenna connected to said transmission system, which sends the transmission signals into the container, and receives as received signals their signal fractions reflected in the container back in the direction of said antenna after a travel time dependent on the distance from the associated reflector of the fill-level measuring device, and which has for different center frequencies different spatial radiation characteristics dependent on the center frequency of the transmission signals; and a signal processing system, connected to said transmission system and said antenna, which receives the received signals and evaluates such based on the center frequencies of the microwave pulses of the associated transmission signals and the center frequency dependence of the spatial radiation characteristic of the said antenna, wherein:

said antenna is a rod-shaped, and rectangular shaped hollow conductor with slots, which has an input fed by said transmission system, whose end lying opposite the input is terminally short circuited, terminated with a reflection free termination, or open, and which has a hollow conductor wall, which is provided with slot shaped slot like or fractal shaped cutouts, via which said antenna sends the transmission signals with a spatial radiation characteristic different for different center frequencies dependent on the positioning and dimensioning of said cutouts and the center frequencies of the supplied transmission signals; and said antenna includes a focusing apparatus for focusing the transmission signals emerging from said antenna, a funnel-shaped or rectangular, hollow conductor segment arranged outwardly on the hollow conductor wall and enclosing all cutouts, a lens arranged outwardly on said hollow conductor wall, said lens comprising a dielectric lens or a magnetic lens, plates of one or more planar plies of a dielectric material applied outwardly on said cutouts, or other rectangular, hollow conductors embodied identically to the rectangular, hollow conductor and connected with said rectangular, hollow conductor to form a group of parallely amplitudes— and phase equally fed, rectangular, hollow conductors arranged together, parallel to one another, directly next to one another and perpendicular to the longitudinal axis of said rectangular, hollow conductor.

2. The fill-level measuring device as claimed in claim 1, wherein:

said antenna is an antenna, especially a horn-, rod- or reflector antenna, which has a radiation characteristic, which includes a main lobe pointing in a main transmission direction and having an aperture angle rising with decreasing center frequency of the transmission signals.

3. A fill-level measuring device working according to the pulse radar principle for measuring a fill level of a fill substance in a container, comprising:

a transmission system having a pulse producing system, connected to a control unit, which is embodied in such a manner that, in predetermined measuring cycles comprising, in each case, at least two measurements, for each measurement, it produces a transmission signal composed of microwave pulses of a center frequency predetermined for the particular measuring, wherein the center frequencies of the transmission signals of at least two of the measurings are different from one another;

an antenna connected to said transmission system, which sends the transmission signals into the container, and receives as received signals their signal fractions reflected in the container back in the direction of said antenna after a travel time dependent on the distance from the associated reflector of the fill-level measuring device, and which has for different center frequencies different spatial radiation characteristics dependent on the center frequency of the transmission signals; and a signal processing system, connected to said transmission system and said antenna, which receives the received signals and evaluates such based on the center frequencies of the microwave pulses of the associated transmission signals and the center frequency dependence of the spatial radiation characteristic of the said antenna, wherein:

said antenna is a rod-shaped and rectangular shaped hollow conductor with slots, which has an input fed by said transmission system, whose end lying opposite the input is terminally short circuited, terminated with a reflection free termination, or open, and which has a hollow conductor wall, which is provided with cutouts, especially with slot shaped, slot like or fractal shaped cutouts, via which said antenna sends the transmission signals with a spatial radiation characteristic different for different center frequencies dependent on the positioning and dimensioning of said cutouts and the center frequencies of the supplied transmission signals; and the fill-level measuring device, wherein:

said cutouts are positioned and dimensioned in such a manner that the radiation characteristic of said antenna in the case of said closed end with a reflection free termination has a main transmission lobe and, in the case of said short-circuited or open end, two main transmission lobes extending symmetrically to the surface normal to said hollow conductor wall; and an angle at which said main transmission lobes extend relative to the surface normal to said hollow conductor wall changes with the center frequency of the transmission signals.

* * * * *